(12) United States Patent
Miyamoto et al.

(10) Patent No.: US 11,546,180 B2
(45) Date of Patent: Jan. 3, 2023

(54) DATA MANAGEMENT APPARATUS, DATA MANAGEMENT METHOD, AND DATA COMMUNICATION SYSTEM

(71) Applicant: KDDI CORPORATION, Tokyo (JP)

(72) Inventors: Atsushi Miyamoto, Tokyo (JP); Masato Andou, Tokyo (JP); Eiji Yamada, Tokyo (JP); Masaharu Hattori, Tokyo (JP); Hirofumi Iizuka, Tokyo (JP)

(73) Assignee: KDDI CORPORATION, Tokyo (JP)

(*) Notice: Subject to any disclaimer, the term of this patent is extended or adjusted under 35 U.S.C. 154(b) by 0 days.

(21) Appl. No.: 17/130,942

(22) Filed: Dec. 22, 2020

(65) Prior Publication Data

US 2021/0111912 A1    Apr. 15, 2021

Related U.S. Application Data

(63) Continuation of application No. 16/328,567, filed as application No. PCT/JP2017/030506 on Aug. 25, 2017, now Pat. No. 10,892,904.

(30) Foreign Application Priority Data

Aug. 31, 2016  (JP) .............................. JP2016-170322
Aug. 31, 2016  (JP) .............................. JP2016-170323
(Continued)

(51) Int. Cl.
*H04M 11/00*    (2006.01)
*H04L 12/14*    (2006.01)
(Continued)

(52) U.S. Cl.
CPC ........ *H04L 12/1403* (2013.01); *H04M 15/41* (2013.01); *H04M 15/61* (2013.01);
(Continued)

(58) Field of Classification Search
CPC ................. H04L 12/14; H04L 12/1403; H04L 12/1432; H04L 12/1435; H04L 12/1439;
(Continued)

(56) References Cited

U.S. PATENT DOCUMENTS

| 10,148,688 B1 | 12/2018 | Shavell et al. |
| 2001/0055961 A1 | 12/2001 | Nakajima |

(Continued)

FOREIGN PATENT DOCUMENTS

| EP | 1339210 A1 | 8/2003 |
| JP | 2001-168916 A | 6/2001 |

(Continued)

OTHER PUBLICATIONS

Japan Office Action (including English Language Translation), dated Aug. 17, 2021, in Japanese Patent Application No. 2020-118179.

(Continued)

*Primary Examiner* — Huy C Ho
(74) *Attorney, Agent, or Firm* — Greenblum & Bernstein, P.L.C.

(57) ABSTRACT

A data management apparatus manages a plurality of data items output by a plurality of communication devices that output data. The data management apparatus includes at least one memory configured to store instructions, and at least one processor configured to execute the instructions. The instructions, when executed by the at least one processor, include receiving a data acquisition request, including an application identification of an application from the data acquisition apparatus, extracting data output by the application on a communication device corresponding to the application identification included in the data acquisition request, among the plurality of data items received from the plurality of communication devices via a relay apparatus, (Continued)

and transmitting the extracted data to the data acquisition apparatus.

18 Claims, 15 Drawing Sheets

(30) Foreign Application Priority Data

Aug. 31, 2016 (JP) .............................. JP2016-170324
Aug. 31, 2016 (JP) .............................. JP2016-170325

(51) Int. Cl.
| | |
|---|---|
| *H04M 15/00* | (2006.01) |
| *H04W 4/24* | (2018.01) |
| *H04W 88/02* | (2009.01) |
| *H04M 1/724* | (2021.01) |
| *H04M 1/72403* | (2021.01) |

(52) U.S. Cl.
CPC ............. *H04M 15/62* (2013.01); *H04W 4/24* (2013.01); *H04M 1/724* (2021.01); *H04M 1/72403* (2021.01); *H04W 88/02* (2013.01)

(58) Field of Classification Search
CPC ........... H04M 15/765; H04M 15/7652; H04M 15/7657; H04M 15/77; H04M 15/80; H04M 15/8011; H04M 15/8005; H04M 15/8033; H04M 15/8083; H04M 15/8088; H04M 2215/0152; H04M 2215/22; H04M 2215/20; H04M 2215/26; H04M 15/41; H04M 15/61; H04M 15/62; H04M 1/724; H04M 1/72403; H04M 15/00; H04W 4/24; H04W 88/02
USPC ......................................................... 455/406
See application file for complete search history.

(56) References Cited

U.S. PATENT DOCUMENTS

| | | | |
|---|---|---|---|
| 2006/0068785 | A1 | 3/2006 | Kamijo et al. |
| 2010/0056161 | A1 | 3/2010 | Matsumura |
| 2012/0055743 | A1 | 3/2012 | Jun |
| 2013/0055257 | A1 | 2/2013 | Yamashita |
| 2013/0168216 | A1 | 7/2013 | Tak |
| 2015/0271212 | A1 | 9/2015 | Sawaki et al. |
| 2016/0057080 | A1* | 2/2016 | Muso ............... H04L 67/28 709/219 |
| 2016/0270256 | A1 | 9/2016 | Abe |
| 2016/0300316 | A1* | 10/2016 | Beseda ............. G06Q 30/012 |
| 2016/0381620 | A1 | 12/2016 | Panaitopol et al. |

FOREIGN PATENT DOCUMENTS

| | | |
|---|---|---|
| JP | 2002-041994 A | 2/2002 |
| JP | 2002-209030 A | 7/2002 |
| JP | 2004-153778 A | 5/2004 |
| JP | 2005-210178 A | 8/2005 |
| JP | 2006-293519 A | 10/2006 |
| JP | 2008-054021 A | 3/2008 |
| JP | 2011-250171 A | 12/2011 |
| JP | 2012-100131 A | 5/2012 |
| JP | 2012-235440 A | 11/2012 |
| JP | 2015-529869 A | 10/2015 |
| JP | 2016-032202 A | 3/2016 |
| JP | 2016-048884 A | 4/2016 |
| JP | 2016-062389 A | 4/2016 |
| JP | 2019-083528 A | 5/2019 |
| WO | 2013/024673 A1 | 2/2013 |
| WO | 2013/031498 A1 | 3/2013 |
| WO | 2013-188536 A1 | 12/2013 |
| WO | 2014/181485 A1 | 11/2014 |
| WO | 2015/001657 A1 | 1/2015 |

OTHER PUBLICATIONS

Japan Office Action (including English Language Translation), dated Aug. 17, 2021, in Japanese Patent Application No. 2020-119134.
Japan Office Action (including English Language Translation), dated Dec. 21, 2021, in Japanese Patent Application No. 2020-119134.
U.S. Appl. No. 16/329,526 to Atsushi Miyamoto et al., filed Feb. 28, 2019.
International Search Report issued in International Bureau of WIPO Patent Application No. PCT/JP2017/030506, dated Nov. 21, 2017, along with an English translation thereof.
Notice of Reasons for Rejection issued in Japanese family member Patent Appl. No. 2016/170325, dated May 8, 2018, along with an English translation thereof.
Office Action issued in Japanese family member Patent Appl. No. 2018-226578, dated Oct. 29, 2019, along with an English translation thereof.
Search Report issued in European Patent Office (EPO) Patent Application No. 17846326.1, dated Feb. 19, 2020.
USPTO Official Action, dated Apr. 22, 2020, in U.S. Appl. No. 16/328,567.
USPTO Notice of Allowance and Fee(s) Due, dated Aug. 26, 2020, in U.S. Appl. No. 16/328,567.
Japan Office Action (including English Language Translation), dated Oct. 25, 2022, in Japanese Patent Application No. 2022-068111.

* cited by examiner

FIG. 6A

| CONTRACTOR ID | RELAY APPARATUS ID | DEVICE ID |
|---|---|---|
| 00001 | 9001 | 1001, 1002, 1003, 1004, 1005, ··· |
| 00002 | 9002 | 2001, 2002, 2003, 2004, 2005, ··· |
| 00003 | 9003 | 3001, 3002, 3003, 3004, 3005, ··· |
| 00004 | 9004 | 4001, 4002, 4003, 4004, 4005, ··· |
| ··· | ··· | ··· |

FIG. 6B

| CONTRACTOR ID=00001 | | |
|---|---|---|
| DEVICE ID | NUMBER OF TIMES OF OCCURRENCE OF COMMUNICATION | DATA COMMUNICATION TRAFFIC VOLUME |
| 1001 | 30 | 35000 |
| 1002 | 25 | 24300 |
| 1003 | 3 | 8900 |
| 1004 | 30 | 45000 |
| 1005 | 28 | 33200 |
| 合計 | 116 | 146400 |

FIG. 7

| ACQUIRER ID | DEVICE ID | APPLICATION ID | AMOUNT OF ACQUIRED DATA |
|---|---|---|---|
| S0001 | 1001 | a51 | 3000 |
|  |  | a52 | 2000 |
|  | 1002 | a51 | 5200 |
|  |  | a52 | 3400 |
| S0002 | 1001 | a55 | 800 |
|  | 2002 | a55 | 1500 |
|  | 2005 | a55 | 2100 |
| S0003 | 1001 | a51 | 3000 |
|  |  | a52 | 2000 |
|  |  | a53 | 2500 |
|  | 3001 | a54 | 6500 |
|  | 3002 | a54 | 5400 |
| S0004 | 4003 | a52 | 3100 |
| ... | ... | ... | ... |

FIG. 8

| ACQUIRER ID | DEVICE ID | APPLICATION ID | AMOUNT OF ACQUIRED DATA | BURDEN RATE | AMOUNT OF CHARGING TARGET DATA |
|---|---|---|---|---|---|
| S0001 | 1001 | a51 | 3000 | 50% | 1500 |
| | 1001 | a52 | 2000 | 33% | 660 |
| | 1002 | a51 | 5200 | 100% | 5200 |
| | 1002 | a52 | 3400 | 100% | 3400 |
| S0002 | 1001 | a55 | 800 | 100% | 800 |
| | 2002 | a55 | 1500 | 100% | 1500 |
| | 2005 | a55 | 2100 | 100% | 2100 |
| S0003 | 1001 | a51 | 3000 | 50% | 1500 |
| | 1001 | a52 | 2000 | 33% | 660 |
| | 1001 | a53 | 2500 | 100% | 2500 |
| | 3001 | a54 | 6500 | 100% | 6500 |
| | 3002 | a54 | 5400 | 100% | 5400 |
| S0004 | 1001 | a52 | 3100 | 33% | 1023 |
| ... | ... | ... | ... | ... | ... |

FIG. 10

| CONTRACTOR ID=00001 | | |
|---|---|---|
| DEVICE ID | APPLICATION ID | NUMBER OF DAYS OF OCCURRENCE OF COMMUNICATION |
| 1001 | 1 | 30 |
| | 2 | 8 |
| 1002 | 1 | 30 |
| | 2 | 8 |
| 1003 | 1 | 30 |
| | 3 | 20 |
| | 4 | 15 |
| 1004 | 1 | 30 |
| | 3 | 20 |
| 1005 | 2 | 8 |
| TOTAL | | 199 |

FIG. 12

| BASE STATION ID | RELAY APPARATUS ID | CONTRACTOR ID |
|---|---|---|
| B00001 | 9001 | 00001 |
| | 9002 | 00002 |
| | 9003 | 00003 |
| B00002 | 9004 | 00004 |
| | 9005 | 00005 |
| | 9006 | |
| B00003 | 9007 | 00005 |
| | 9008 | 00006 |
| | 9009 | |
| | 9010 | |
| ⋮ | ⋮ | ⋮ |

FIG. 13

| CONTRACTOR ID 00005 | | | | | |
|---|---|---|---|---|---|
| BASE STATION ID | AVERAGE COMMUNICATION TRAFFIC VOLUME | PEAK TIME COMMUNICATION TRAFFIC VOLUME | RELAY APPARATUS ID | AVERAGE COMMUNICATION TRAFFIC VOLUME | PEAK TIME COMMUNICATION TRAFFIC VOLUME |
| B00002 | 5GB/day | 90Mbps | 9005 | 2.8GB/day | 85Mbps |
| | | | 9006 | 2.2GB/day | 90Mbps |
| B00003 | 3GB/day | 45Mbps | 9007 | 3GB/day | 45Mbps |

FIG. 14

| CONTRACTOR ID 000005 | | | |
|---|---|---|---|
| BASE STATION ID | NUMBER OF TIMES EXCEEDING THRESHOLD VALUE | RELAY APPARATUS ID | NUMBER OF TIMES EXCEEDING THRESHOLD VALUE |
| B00002 | 3 | 9005 | 2 |
| | | 9006 | 1 |
| B00003 | 0 | 9007 | 0 |

FIG. 15

| BASE STATION ID | REGION ID |
|---|---|
| B00001 | A0001 |
| B00002 | |
| B00003 | |
| B00004 | A0002 |
| B00005 | A0003 |
| B00006 | |
| ... | ... |

DATA MANAGEMENT APPARATUS, DATA MANAGEMENT METHOD, AND DATA COMMUNICATION SYSTEM

This is a continuation of U.S. application Ser. No. 16/328,567, filed Feb. 26, 2019, which is a national stage entry of International Patent Application No. PCT/JP2017/030506, filed Aug. 25, 2017, which claims priority to Japanese Patent Application Nos. 2016-170322, 2016-170323, 2016-170324, and 2016-170325, each filed Aug. 31, 2016. The disclosure of each of the above-mentioned documents, including the specification, drawings, and claims, is incorporated herein by reference in its entirety.

TECHNICAL FIELD

The present invention relates to a data management apparatus, a data management method, and a data communication system for managing data received from a communication device.

BACKGROUND ART

In a portable phone service, a charge amount is determined for each communication terminal that is a unit of a contract for a service. Patent Document 1 discloses technology for determining a charge amount for each subscriber identity module (SIM) attached to a communication terminal making a contract for a service.

CITATION LIST

Patent Literature

[Patent Document 1]
Japanese Unexamined Patent Application, First Publication No. 2008-054021

SUMMARY OF INVENTION

Problem to be Solved by the Invention

In recent years, communication devices having a sensor function have been installed in various objects and places and data transmitted from the communication devices has been collected by a server and provided to a user who uses the collected data. A relay apparatus configured to collect data transmitted by a plurality of communication devices and transmit the collected data to the server via a communication circuit is used to collect data transmitted from the communication devices to the server.

In this manner, a data processing technique in which data is transmitted from the relay apparatus configured to collect data from the communication devices to the server via a communication network is known. However, an appropriate charging method in data processing has not been developed.

Therefore, the present invention has been made in view of the above instances and an objective of the present invention is to provide a data management apparatus, a data management method, and a data communication system capable of determining a charge amount, as an appropriate amount of money, in data processing in which data is transmitted from a relay apparatus configured to collect data from a communication device to a server via a communication network.

Means for Solving the Problem

According to a first aspect of the present invention, there is provided a data management apparatus for managing a plurality of data items output by a plurality of communication devices that are configured to output data, the data management apparatus including: a storage section configured to store device identification information of each of the plurality of communication devices in association with charge identification information including either contractor identification information of a contractor of a contract for using a relay apparatus that is configured to transfer the plurality of data items to the data management apparatus or acquirer identification information of a data acquirer who acquires the data from the data management apparatus; and a charge amount determination section configured to determine a charge amount for each item of the charge identification information on the basis of data communication traffic volumes corresponding to data output from the communication devices of one or more device identification information items stored in association with the charge identification information.

The charge identification information may include the contractor identification information, the data management apparatus may further include an identification section configured to identify, for each item of the contractor identification information, the data communication traffic volume corresponding to the amount of transmission in which the relay apparatus has transmitted the plurality of data items output by the plurality of communication devices of a plurality of device identification information items stored in association with the contractor identification information within a prescribed period, and the charge amount determination section may determine the charge amount for the contractor on the basis of the data communication traffic volume identified by the identification section.

The identification section may identify the number of days or the number of times communication has occurred within the prescribed period in each communication device of the plurality of communication devices and identify the data communication traffic volume on the basis of a total number of days or a total number of times obtained by calculating the number of days or the number of times for the plurality of communication devices.

The identification section may identify a time in which communication has occurred within the prescribed period in each communication device of the plurality of communication devices and identify the data communication traffic volume on the basis of a total time obtained by calculating the time for the plurality of communication devices.

The identification section may identify the amount of data communicated within the prescribed period in each communication device of the plurality of communication devices and identify the data communication traffic volume on the basis of the total amount of data obtained by calculating the amount of data for the plurality of communication devices.

The storage section may store the contractor identification information, the device identification information, and application identification information indicating an application executable by each of the plurality of communication devices in association, and the identification section may identify the data communication traffic volume for each item of the application identification information communicated within the prescribed period in the plurality of communication devices.

The charge amount determination section may determine the charge amount for the contractor on the basis of data communication traffic volumes of one or more communication devices in which the data communication traffic volumes within the prescribed period have exceeded a prescribed value among the plurality of communication devices.

The charge amount determination section may determine the charge amount for the contractor on the basis of data communication traffic volumes of one or more communication devices in which communication success rates within the prescribed period have exceeded a prescribed value among the plurality of communication devices.

The identification section may transmit checking data for checking situations to at least some communication devices among the plurality of communication devices, and the charge amount determination section may determine the charge amount with excluding the communication device from which response data for the checking data has not been transmitted until a prescribed time has elapsed from the transmission of the checking data by the identification section from charging targets.

The charge amount determination section may determine the charge amount with excluding a period from an expiration date of the prescribed period to a date of occurrence of immediately previous communication or a date of reception of immediately previous response data from a charging target with respect to the communication device from which response data for the checking data has not been transmitted until a prescribed time has elapsed from the transmission of the checking data by the identification section.

The charge identification information may include the acquirer identification information, the data management apparatus may further include a communication section configured to receive the plurality of data items via a communication network from the relay apparatus and provide data corresponding to the communication device of the device identification information stored in association with the acquirer identification information among the plurality of received data items to a data acquisition apparatus used by the data acquirer corresponding to the acquirer identification information, and the charge amount determination section may determine a charge amount for the data acquirer receiving the data provided by the communication section.

The data management apparatus may further include a request, from the data acquisition apparatus, acceptance section configured to accept a data acquisition request including the device identification information of the communication device that is a target from which the data is acquired and cause the device identification information included in the data acquisition request to be stored in the storage section in association with the acquirer identification information corresponding to the data acquisition apparatus.

The request acceptance section may accept data acquisition requests including the same device identification information from a plurality of data acquisition apparatuses, and the communication section may provide the plurality of data acquisition apparatuses with data transmitted by the communication device indicated in the data acquisition requests received via the communication network when the request acceptance section has accepted the data acquisition requests from the plurality of data acquisition apparatuses.

The charge amount determination section may determine the charge amount for the data acquirer on the basis of the amount of the data acquired by the data acquisition apparatus and a burden rate that is a rate of a burden of a communication fee corresponding to the amount of data.

The charge amount determination section may determine the burden rate on the basis of the number of data acquisition apparatuses that are configured to acquire the data output by the same communication device.

The charge amount determination section may validate the burden rate on condition that a notification for granting the burden rate has been received from the data management apparatus after transmission of the burden rate to the data acquisition apparatus.

The data management apparatus may further include a communication control section configured to permit the relay apparatus to transmit the data corresponding to the communication device of the device identification information stored in association with the acquirer identification information to the data management apparatus.

The communication control section may prevent the relay apparatus from transmitting the data corresponding to the communication device of the device identification information that is not stored in association with the acquirer identification information to the data management apparatus.

The communication section may provide the received data to the data acquisition apparatus determined on the basis of a position of the communication device at a point in time at which the data output by the communication device has been received or a clock time at which the data has been received.

The charge amount determination section may determine the charge amount in association with a position of the communication device at a point in time at which the data output by the communication device has been received or a clock time at which the data has been received.

The charge identification information may include the contractor identification information, the data management apparatus may further include a reception section configured to receive data transmitted by the relay apparatus; and a transmission section configured to transmit data received by the reception section to a prescribed data acquisition apparatus, and the charge amount determination section may determine a charge amount for the contractor or the data acquirer on the basis of the amount of transmitted data that is transmitted from the relay apparatus and is data output from the communication device of the device identification information stored in association with the contractor identification information and the amount of non-reception data that has not been received by the reception section among items of the transmitted data.

The reception section may receive the amount of non-reception data from the relay apparatus, and the charge amount determination section may determine the charge amount by subtracting an amount of money corresponding to the amount of the non-reception data from a standard charge amount corresponding to the amount of transmitted data.

The reception section may receive clock time information indicating a clock time at which the non-reception data has been transmitted from the relay apparatus, and the charge amount determination section may further determine the charge amount on the basis of the clock time indicated in the clock time information.

The charge amount determination section may further determine the charge amount on the basis of a degree of congestion of a communication network at the clock time. Also, the charge amount determination section may decrease the amount of money to be subtracted from the standard charge amount as the degree of congestion increases.

The charge amount determination section may determine the charge amount on the basis of a cause of non-reception of a response from the data acquisition apparatus until a prescribed period has elapsed from transmission of the data to the data management apparatus in the relay apparatus.

The charge amount determination section may determine the charge amount without subtracting an amount of money corresponding to the amount of non-reception data when the cause exists in the data acquisition apparatus.

The storage section may further store application identification information of each of a plurality of applications executable by the communication device in association with the acquirer identification information of the data acquirer who acquires the data output by each of the plurality of applications, and the charge amount determination section may determine a charge amount for the data acquirer on the basis of the amount of transmitted data output from the application of the application identification information stored in the association with the acquirer identification information and the amount of non-reception data that has not been received by the reception section among items of the transmitted data.

The charge amount determination section may determine the charge amount by subtracting an amount of money determined for each application for the amount of non-reception data from a standard charge amount corresponding to the amount of transmitted data.

The storage section may store a clock time at which the non-reception data has occurred in association with the device identification information, and the data management apparatus may further include a calculation section configured to calculate statistical value related to a trend in occurrence of the non-reception data for each communication device on the basis of the clock time at which the non-reception data has occurred stored in the storage section.

The storage section may further store relay apparatus identification information for identifying each of a plurality of relay apparatuses that transfer the plurality of data items to the data management apparatus via each base station constituting a communication network and the contractor identification information in association, the data management apparatus may further include an identification section configured to identify, for each item of the contractor identification information, a data communication traffic volume communicated during a prescribed charging unit period between the relay apparatus of the relay apparatus identification information stored in association with the contractor identification information and the data management apparatus, and the charge amount determination section may determine the charge amount for the contractor on the basis of a magnitude of a data communication traffic volume per unit time of the data communication traffic volume identified by the identification section.

According to a second aspect of the present invention, there is provided a data management apparatus for managing data to be transmitted and received via a communication network configured to include a plurality of base stations, wherein each of the plurality of base stations relays data to be communicated between a plurality of relay apparatuses and the data management apparatus, and wherein the data management apparatus includes a storage section configured to store relay apparatus identification information for identifying each of the plurality of relay apparatuses that are configured to perform communication via each base station and contractor identification information of a contractor making a contract for enabling at least one relay apparatus of the plurality of relay apparatuses that are configured to perform communication via each base station to use the communication network in association; an identification section configured to identify, for each item of the contractor identification information, a data communication traffic volume communicated during a prescribed charging unit period between the relay apparatus of the relay apparatus identification information stored in association with the contractor identification information and the data management apparatus; and a charge amount determination section configured to determine a charge amount for the contractor on the basis of a magnitude of a data communication traffic volume per unit time of the data communication traffic volume identified by the identification section.

The identification section may identify a sum of target data communication traffic volumes of communication performed by a target relay apparatus as the data communication traffic volume by designating the target relay apparatus installed within a prescribed region as a unit among the relay apparatuses of the relay apparatus identification information stored in association with the contractor identification information for each item of the contractor identification information The identification section may identify a sum of target data communication traffic volumes of communication performed by the relay apparatus via a base station as the data communication traffic volume by designating the base station serving as a communication path of the relay apparatus of the relay apparatus identification information stored in association with the contractor identification information as a unit for each item of the contractor identification information.

The identification section may identify a data communication traffic volume of communication performed by the relay apparatus by designating the relay apparatus of the relay apparatus identification information stored in association with the contractor identification information as a unit for each item of the contractor identification information.

The charge amount determination section may determine the charge amount for the contractor on the basis of a data communication traffic volume per unit time in a predetermined prescribed time period among data communication traffic volumes identified by the identification section.

The charge amount determination section may determine the charge amount for the contractor on the basis of a maximum value of a data communication traffic volume per unit time of the data communication traffic volume identified by the identification section.

The charge amount determination section may determine the charge amount for the contractor on the basis of whether or not the maximum value of the data communication traffic volume has exceeded a prescribed communication traffic volume threshold value.

The charge amount determination section may determine the charge amount so that the charge amount becomes a larger amount of money when the maximum value of the data communication traffic volume is larger than when the maximum value of the data communication traffic volume is smaller if the maximum value of the data communication traffic volume has exceeded the prescribed communication traffic volume threshold value.

The charge amount determination section may determine the charge amount so that the charge amount becomes a smaller amount of money when the maximum value of the data communication traffic volume has not exceeded a prescribed communication traffic volume threshold value than when the maximum value of the data communication traffic volume has exceeded the prescribed communication traffic volume threshold value.

The charge amount determination section may determine the charge amount on the basis of the number of times the maximum value of the data communication traffic volume has exceeded a prescribed communication traffic volume threshold value during the charging unit period.

According to a third aspect of the present invention, there is provided a data management method including: receiving a plurality of data items from a relay apparatus that is configured to relay the plurality of data items output by a plurality of communication devices that output data respectively; referring to a database in which device identification information of each of the plurality of communication devices is associated with charge identification information including either contractor identification information of a contractor of a contract for using a relay apparatus that is configured to transfer the plurality of data items to the data management apparatus or acquirer identification information of a data acquirer who acquires the data from a data management apparatus; and determining a charge amount for each item of the charge identification information on the basis of data communication traffic volumes corresponding to data output from the communication devices of one or more device identification information items associated with the charge identification information in the database.

The charge identification information may include the contractor identification information, the data management method may further include identifying, for each item of the contractor identification information, the data communication traffic volume corresponding to the amount of transmission in which the relay apparatus has transmitted, within a prescribed period, the plurality of data items output by the plurality of communication devices of a plurality of device identification information items associated with the contractor identification information in the database, and the determining may include determining the charge amount for the contractor on the basis of the identified data communication traffic volume.

The charge identification information may include the acquirer identification information, the data management method may further include providing data output by the communication device of the device identification information associated with the acquirer identification information in the database among the received data items to a data acquisition apparatus used by a data acquirer corresponding to the acquirer identification information, and the determining may include determining a charge amount for the data acquirer to whom the data was provided.

The charge identification information may include the contractor identification information, the data management method may further include transmitting the received data to a prescribed data acquisition apparatus, and the determining may include determining a charge amount for the contractor or the data acquirer on the basis of the amount of data received by the data management apparatus and the amount of non-reception data that has not been received by the data management apparatus among items of data output from the communication device of the device identification information associated with the contractor identification information in the database.

The referring may include referring to the database in which relay apparatus identification information for identifying each of a plurality of relay apparatuses that transfer the plurality of data items to the data management apparatus via each base station constituting a communication network is associated with the contractor identification information, the data management method may further include identifying, for each item of the contractor identification information, a data communication traffic volume communicated during a prescribed charging unit period between the relay apparatus of the relay apparatus identification information associated with the contractor identification information in the database and the data management apparatus, and the determining may include determining the charge amount for the contractor on the basis of a magnitude of a data communication traffic volume per unit time of the identified data communication traffic volume.

According to a fourth aspect of the present invention, there is provided a data management method of executing a processor of a data management apparatus for managing data to be transmitted and received via a communication network configured to include a plurality of base stations, wherein each of the plurality of base stations relays data to be communicated between a plurality of relay apparatuses and the data management apparatus, and wherein the processor comprises referring to a storage section storing relay apparatus identification information for identifying each of the plurality of relay apparatuses that are configured to perform communication via each base station and contractor identification information of a contractor making a contract for enabling at least one relay apparatus of the plurality of relay apparatuses that are configured to perform communication via each base station to use the communication network in association and identifying a data communication traffic volume communicated during a prescribed charging unit period between the relay apparatus of the relay apparatus identification information associated with the contractor identification information and the data management apparatus for each item of the contractor identification information; and determining a charge amount for the contractor on the basis of a magnitude of a data communication traffic volume per unit time of the identified data communication traffic volume.

According to a fifth aspect of the present invention, there is provided a data communication system including: a data management apparatus and a relay apparatus configured to communicate each other via a communication network, wherein the relay apparatus includes a reception section configured to receive a plurality of data items output by a plurality of communication devices; and a transmission section configured to transmit the plurality of data items received by the reception section to the data management apparatus, and wherein the data management apparatus includes a storage section configured to store device identification information of each of the plurality of communication devices in association with charge identification information including either contractor identification information of a contractor of a contract for using the relay apparatus or acquirer identification information of a data acquirer who acquires the data from the data management apparatus; and a charge amount determination section configured to determine a charge amount for each item of the charge identification information on the basis of data communication traffic volumes corresponding to data output from the communication devices of one or more device identification information items stored in association with the charge identification information.

The charge identification information may include the contractor identification information, the data management apparatus may further include an identification section configured to identify, for each item of the contractor identification information, the data communication traffic volume corresponding to the amount of transmission in which the relay apparatus has transmitted, within a prescribed period, the plurality of data items output by the plurality of communication devices of a plurality of device identification information items stored in association with the contractor identification information, and the charge amount determination section may determine the charge amount for the contractor on the basis of the data communication traffic volume identified by the identification section.

The charge identification information may include the acquirer identification information, the data management apparatus may further include a communication section configured to receive the plurality of data items from the relay apparatus via a communication network and provide data corresponding to the communication device of the device identification information stored in association with the acquirer identification information among the plurality of received data items to a data acquisition apparatus used by the data acquirer corresponding to the acquirer identification information, and the charge amount determination section may determine a charge amount for the data acquirer to whom the data was provided by the communication section.

The relay apparatus may further include a notification section configured to notify the data management apparatus of the amount of non-reception data for which a response from the data management apparatus has not been received until a prescribed period has elapsed from transmission of the data to the data management apparatus as the amount of non-reception data among amounts of data transmitted to the data management apparatus, the charge identification information may include the contractor identification information, the data management apparatus may further include a reception section configured to receive the data and the amount of non-reception data transmitted by the relay apparatus; and a transmission section configured to transmit the data received by the reception section to a prescribed data acquisition apparatus, and the charge amount determination section may determine the charge amount for the contractor or the data acquirer on the basis of the amount of data received by the data management apparatus and the amount of non-reception data among items of data output from the communication device of the device identification information stored in association with the contractor identification information.

The storage section may further store relay apparatus identification information for identifying each of a plurality of relay apparatuses that transfer the plurality of data items to the data management apparatus via each base station constituting the communication network and the contractor identification information in association, the data management apparatus may further include an identification section configured to identify, for each item of the contractor identification information, a data communication traffic volume communicated during a prescribed charging unit period between the relay apparatus of the relay apparatus identification information stored in association with the contractor identification information and the data management apparatus, and the charge amount determination section may determine the charge amount for the contractor on the basis of a magnitude of a data communication traffic volume per unit time of the data communication traffic volume identified by the identification section.

According to a sixth aspect of the present invention, there is provided a data communication system including a communication network configured to include a plurality of base stations and a data management apparatus configured to manage data to be transmitted and received via the communication network, wherein each of the plurality of base stations includes a communication section for performing data communication between a plurality of relay apparatuses and the data management apparatus, and wherein the data management apparatus includes a storage section configured to store relay apparatus identification information for identifying each of the plurality of relay apparatuses that communicate with each base station through communication and contractor identification information of a contractor making a contract for enabling at least one relay apparatus of the plurality of relay apparatuses that are configured to perform communication via each base station to use the communication network in association; an identification section configured to identify, for each item of the contractor identification information, a data communication traffic volume communicated during a prescribed charging unit period between the relay apparatus of the relay apparatus identification information stored in association with the contractor identification information and the data management apparatus; and a charge amount determination section configured to determine a charge amount for the contractor on the basis of a magnitude of a data communication traffic volume per unit time of the data communication traffic volume identified by the identification section.

Advantageous Effects of Invention

According to the present invention, it is possible to determine a charge amount in data processing in which data is transmitted from a relay apparatus collecting the data from a communication device to a server via a communication network as an appropriate amount of money.

BRIEF DESCRIPTION OF DRAWINGS

FIG. 6A is a diagram showing a first example of records stored in a contractor charge database.

FIG. 6B is a diagram showing a second example of records stored in the contractor charge database.

FIG. 7 is a diagram showing an example of records stored in an acquirer charge database.

FIG. 8 is a diagram showing an example of the acquirer charge database including the amount of charging target data calculated on the basis of a burden rate.

FIG. 10 is a diagram showing a process when a charge amount determination section determines a charge amount on the basis of an application used by the data acquirer.

FIG. 12 is a diagram schematically showing a data structure of a communication path database in which identifiers for identifying a base station, a relay apparatus for which a base station performs a relay operation, and a contractor of the relay apparatus are stored in association.

FIG. 13 is a diagram showing a data structure of a communication traffic volume database in which a peak value of a data communication traffic volume and an average communication traffic volume during a charging unit period between a relay apparatus and a data management apparatus are tabulated for each contractor.

FIG. 14 is a diagram showing a data structure of a database obtained by tabulating the number of times a peak value of a data communication traffic volume has exceeded a data communication traffic volume threshold value for each contractor during a charging unit period in the relay apparatus.

FIG. 15 is a diagram schematically showing a data structure of a regional database stored in association with a relationship between a base station and an installation region thereof.

DESCRIPTION OF EMBODIMENTS

[Configuration of Data Communication System S]

Figure 1:
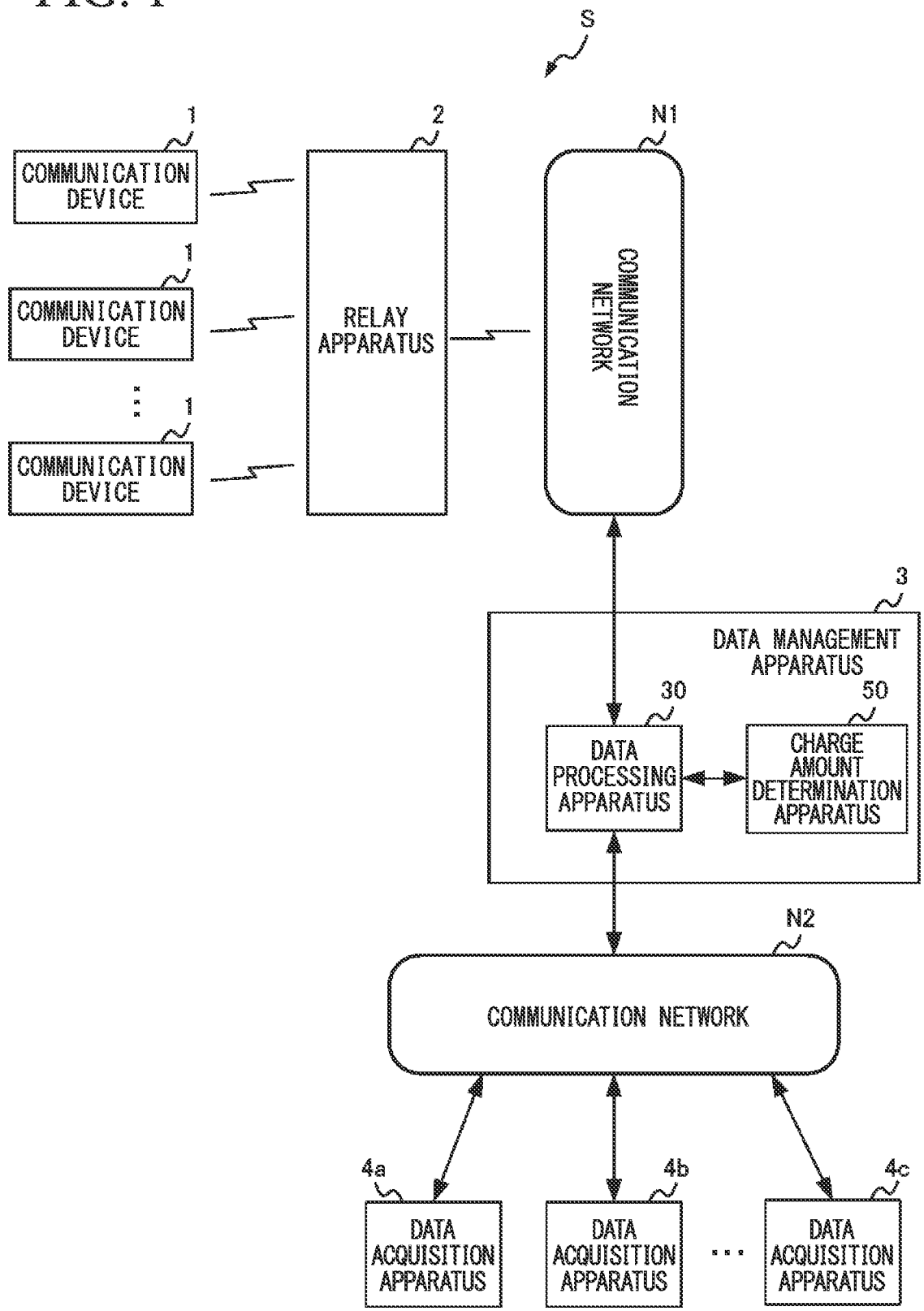
FIG. 1 is a diagram showing a configuration of a data communication system according to an embodiment.

FIG. 1 is a diagram showing a configuration of a data communication system S according to an embodiment. The data communication system S includes a plurality of communication devices 1, a relay apparatus 2, a data management apparatus 3, and data acquisition apparatuses 4 (4a, 4b, and 4c). The relay apparatus 2 can transmit packet data that is device data received from the plurality of communication devices 1 to the data management apparatus 3 via a communication network N1. The communication network N1 includes a portable phone network and the Internet, and the relay apparatus 2 transmits the packet data to the data management apparatus 3 using a portable phone circuit.

The data management apparatus 3 is, for example, a server managed by a communication carrier that provides a service using the communication network N1. The data management apparatus 3 provides packet data received from the relay apparatus 2 to the data acquisition apparatus 4 via a communication network N2 such as an optical communication circuit. The data management apparatus 3 includes a data processing apparatus 30 and a charge amount determination apparatus 50. The data management apparatus 3 may include one or more servers and the data processing apparatus 30 and the charge amount determination apparatus 50 may include different servers or may include one server.

The data acquisition apparatus 4 is a computer capable of accessing a data processing apparatus 30. The data acquisition apparatus 4 is, for example, a personal computer (PC) used by a data acquirer who accesses packet data transmitted from the communication device 1 to the data management apparatus 3, and the data acquirer can view content of the data transmitted by the communication device 1 in his/her PC.

The communication device 1 includes, for example, a sensor, and transmits data based on an output signal of the sensor to the relay apparatus 2. The communication device 1 transmits and receives data to and from the relay apparatus 2 using a wireless communication channel suitable for communication over a relatively short distance as in Wi-Fi (registered trademark), Bluetooth (registered trademark), or the like.

The communication device 1 is installed in a vending machine, a vehicle, an office, a factory, or the like and transmits packet data including various types of information capable of being collected in an installation place to the data acquisition apparatus 4 accessible by the data acquirer making a contract to acquire the information collected by the communication device 1 via the relay apparatus 2 and the data processing apparatus 30. When the communication device 1 is installed in, for example, a vending machine, the communication device 1 collects information about a temperature, the remaining amount of change, the inventory of products, the presence of surrounding people, and the like and transmits packet data including the collected information to the relay apparatus 2.

A volume of packet data to be transmitted by the communication device 1 is smaller than a volume of packet data of speech or images to be transmitted and received in a communication terminal such as a smartphone or a tablet and a length of one packet data is, for example, 100 bytes or less. The packet data to be transmitted by the communication device 1 includes a device ID that is identification information allocated to each communication device 1 and device data including the collected information.

The relay apparatus 2 receives a plurality of packet data items from the plurality of communication devices 1. The relay apparatus 2 temporarily stores the received packet data and transfers the packet data to the data processing apparatus 30 by transmitting the stored packet data to the communication network N1 at a preset timing.

The data processing apparatus 30 collects packet data transmitted from the plurality of communication devices 1 via the relay apparatus 2 and the communication network N1. The data processing apparatus 30 stores the received packet data in a storage medium such as a hard disk and transmits the packet data itself or information generated on the basis of the packet data to the data acquisition apparatus 4 (4a, 4b, or 4c) in response to a request from the data acquisition apparatus 4. Thereby, the data acquirer permitted to acquire data output by the communication device 1 from a contractor making a contract for the use of the communication network N1 in the relay apparatus 2 can acquire data or statistical information permitted by the contractor of the relay apparatus 2 by accessing the data processing apparatus 30 via the data acquisition apparatus 4. The data processing apparatus 30 has, for example, a privacy policy manager (PPM) function, and can control which data acquisition apparatus 4 can acquire data output from the communication device 1.

Also, the data processing apparatus 30 notifies the charge amount determination apparatus 50 of a date and time when packet data has been received from the relay apparatus 2, the number of times the packet data has been received, the amount of received packet data, and the like in association with acquirer identification information (hereinafter referred to as an acquirer ID) allocated to a data acquirer who acquires the collected packet data or statistical information generated on the basis of the packet data and device identification information (hereinafter referred to as a device ID) allocated to each of the plurality of communication devices used by the data acquirer. The data processing apparatus 30 may further notify the charge amount determination apparatus 50 of a date and time when packet data has been received from the relay apparatus 2, the number of times the packet data has been received, the amount of received packet data, and the like in association with contractor identification information (hereinafter referred to as a contractor ID) allocated to the contractor making a contract for the use of the communication network N1 in the relay apparatus 2 and device IDs of a plurality of communication devices that transmit the packet data to the data processing apparatus 30 via the relay apparatus 2.

The data acquisition apparatus 4 is a server accessible by a data acquirer using a computer or a portable terminal. In response to a request from the data acquirer, the data acquisition apparatus 4 can acquire data output by at least any one of a plurality of applications executable by the communication device 1 from the data processing apparatus 30 by transmitting a data acquisition request including a device ID of a communication device 1 and an application ID of an application among targets from which data is acquired to the data processing apparatus 30. The data acquisition apparatus 4 provides the data acquirer with data received from the data processing apparatus 30 or a data analysis result.

The charge amount determination apparatus 50 determines a charge amount for a communication service in which the packet data output by the communication device 1 is transmitted from the relay apparatus 2 to the data processing apparatus 30. Also, the charge amount determination apparatus 50 determines a charging destination of a charge amount for the amount of transmission of packet data, from the relay apparatus 2 associated with the data acquirer to the data processing apparatus 30, output by the application of the communication device 1 associated with the data acquirer (hereinafter referred to as a "data communication traffic volume"). For example, the charge amount determination apparatus 50 determines a charge amount for each data acquirer during each prescribed unit period (e.g., one month).

Also, the charge amount determination apparatus 50 also determines a charge amount for the contractor of the relay apparatus 2. The charge amount determination apparatus 50 determines the charge amount for the contractor on the basis of the amount of transmission of packet data transmitted by the communication device 1 that transmits packet data via the relay apparatus 2 from the relay apparatus 2 associated with the contractor to the data processing apparatus 30. For example, the charge amount determination apparatus 50 determines a charge amount for each contractor during each prescribed unit period (e.g., one month).

Here, when the communication device 1 is installed in a vending machine, the data acquirer is, for example, a management company of a vending machine, a beverage maker that manufactures products of a vending machine, a company that provides marketing information, or the like. The data acquirer makes a contract for acquiring data output by a desired application of a desired communication device 1 with a communication carrier that manages the data processing apparatus 30 and the charge amount determination apparatus 50. The charge amount determination apparatus 50 stores an acquirer ID of each data acquirer, device IDs of one or more communication devices 1 selected by each data acquirer, and application IDs of one or more applications selected by each data acquirer in association. The charge amount determination apparatus 50 determines the charge amount for each data acquirer on the basis of the device ID associated with the acquirer ID and the amount of data output by an application corresponding to the application ID within a prescribed period.

Figure 2:
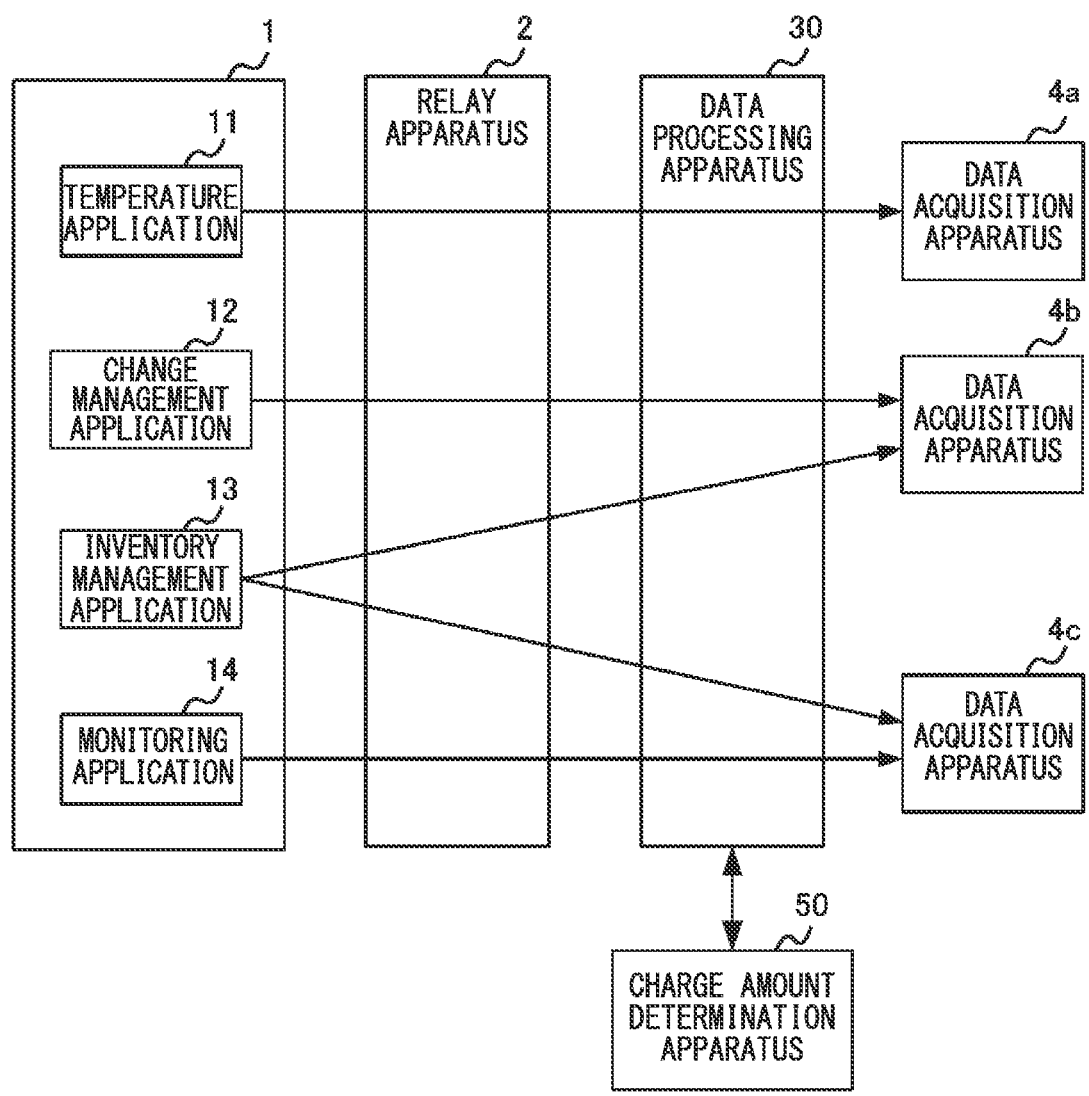
FIG. 2 is a diagram schematically showing a flow of data in a data communication system.

The charge amount determination apparatus 50 registers the determined charge amount in a database in which charge amounts for the contractor and the data acquirer are managed. Thereby, the communication carrier can charge money according to the amount of information obtained from the communication device 1 by the data acquirer, FIG. 2 is a diagram schematically showing a flow of data in the data communication system S. One communication device 1 can execute a plurality of applications corresponding to a plurality of types of information. The communication device 1 shown in FIG. 2 is installed in a vending machine and can execute a temperature application 11, a change management application 12, an inventory management application 13, and a monitoring application 14.

The temperature application 11 can transmit temperature information indicating an internal temperature of the vending machine. The change management application 12 can transmit change information indicating the remaining change in the vending machine. The inventory management application 13 can transmit inventory information indicating the number of inventory products to be sold in the vending machine. The monitoring application 14 can transmit person detection information indicating a time when a person within a prescribed distance from the vending machine has been detected.

Information to be transmitted by each application is allocated to the data acquisition apparatus 4 registered in advance by the data processing apparatus 30. In the example shown in FIG. 2, the temperature information output by the temperature application 11 is transmitted to the data acquisition apparatus 4*a* of the data acquirer who maintains the vending machine. The change information output by the change management application 12 is transmitted to the data acquisition apparatus 4*b* of the data acquirer that manages products. The inventory information output by the inventory management application 13 is transmitted to the data acquisition apparatus 4*b* and the data acquisition apparatus 4*c* of the data acquirer that provides the marketing information. The person detection information output by the monitoring application 14 is transmitted to the data acquisition apparatus 4*c*.

In this case, the charge amount determination apparatus 50 determines the charge amount fir the data acquirer of the data acquisition apparatus 4*a* in accordance with a data communication traffic volume of the temperature information output by the temperature application 11. The charge amount determination apparatus 50 determines the charge amount for the data acquirer of the data acquisition apparatus 4*b* in accordance with data communication traffic volumes of the change information output by the change management application 12 and the inventory information output by the inventory management application 13. The charge amount determination apparatus 50 determines the charge amount for the data acquirer of the data acquisition apparatus 4*c* in accordance with data communication traffic volumes of the inventory information output by the inventory management application 13 and the person detection information output by the monitoring application 14.

Also, a place where the communication device 1 is installed is able to be selected and the communication device 1 may be installed within, for example, a car. When the communication device 1 is installed within a car, the communication device 1 can transmit the remaining amount of gasoline, the remaining amount of battery power, traveling data (a traveling distance, an average speed, fuel consumption, a frequency of sudden braking, and the like), position information, fault information of the body of a car, and the like to the data processing apparatus 30.

[Configuration of Relay Apparatus 2]

Figure 3:
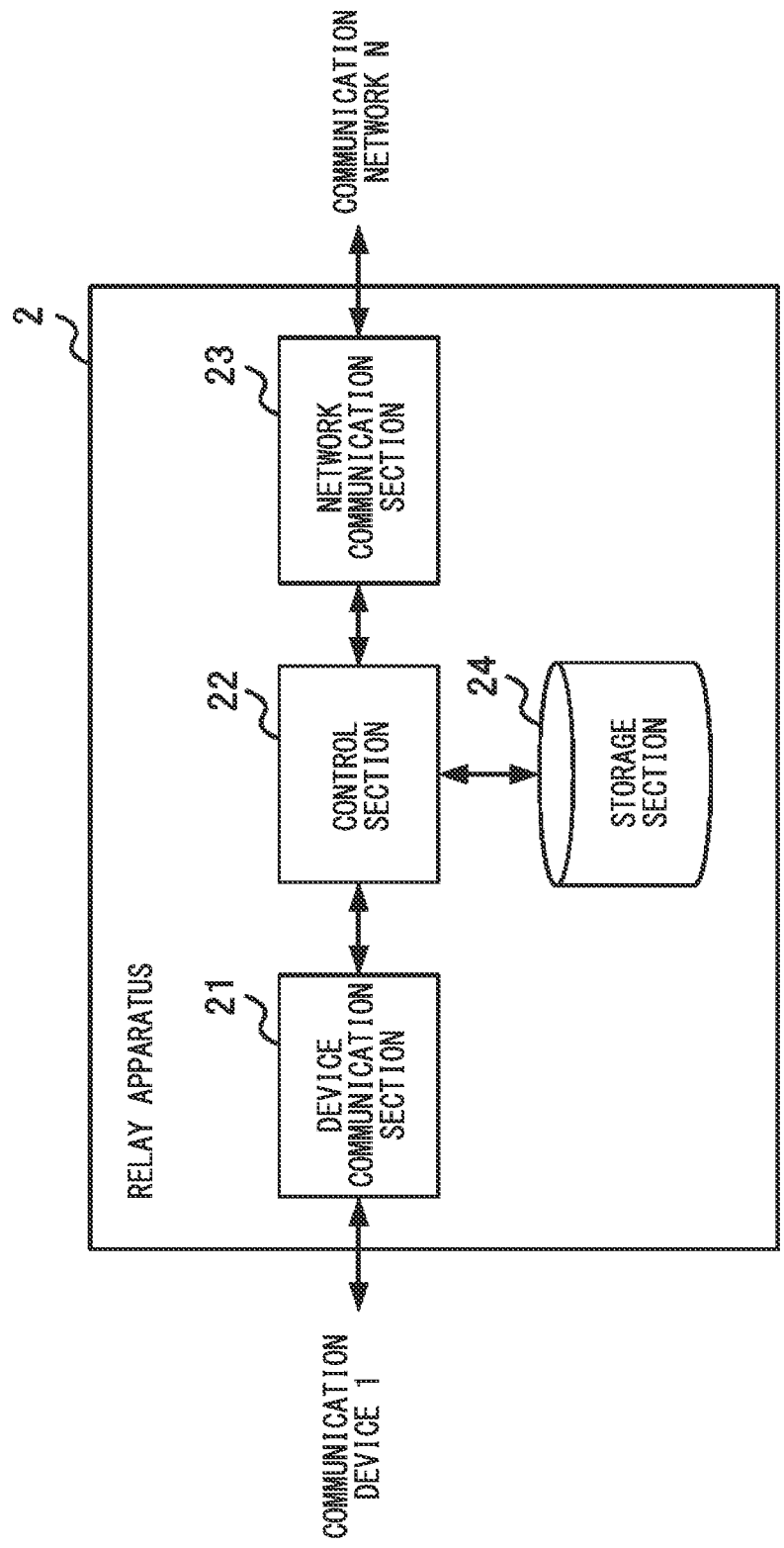
FIG. 3 is a diagram showing a configuration of a relay apparatus.

Next, configurations and operations of the relay apparatus 2 and the charge amount determination apparatus 50 will be described in detail. FIG. 3 is a diagram showing the configuration of the relay apparatus 2. The relay apparatus 2 includes a device communication section 21, a control section 22, a network communication section 23, and a storage section 24.

The device communication section 21 is a wireless communication interface for receiving data transmitted by the communication device 1.

The control section 22 is, for example, a central processing unit (CPU), and causes the storage section 24 to store data received via the device communication section 21. Also, the control section 22 reads data stored in the storage section 24 at a prescribed timing and transmits the read data to the communication network N1 via the network communication section 23. For example, the control section 22 transmits data to the communication network N1 when a time period during which a traffic volume of the communication network N1 is less than a prescribed threshold value is reached.

The control section 22 may determine a timing at which data is transmitted on the basis of priority of data received from the communication device 1. For example, the control section 22 transmits high-priority data to the communication network N1 without storing the data in the storage section 24. Also, the control section 22 causes the storage section 24 to store low-priority data so that the low priority data is not transmitted at the same timing as that of the high-priority data. The control section 22 may not transmit the low-priority data during a time period indicated in a notification from the data management apparatus 3 in advance. Thereby, the control section 22 can quickly transmit the data to be transmitted without delay while preventing a traffic volume of the communication network N1 from being excessively increased. Also, in the data communication system S, a communication bandwidth may be preferentially allocated by a base station side of the communication network N1 for the relay apparatus 2 that communicates with the communication device 1 capable of executing an application that outputs high-priority data. Thereby, the control section 22 can transmit high-priority data at high speed.

The control section 22 may transmit data received from the communication device 1 at a clock time set by the data acquirer received via the data processing apparatus 30. For example, the data acquirer can set a clock time for causing the relay apparatus 2 to transmit the data for each communication device 1 or each application. When the charge amount determination apparatus 50 determines a charge amount on the basis of a charge amount per unit data communication traffic volume determined for each time period during which the relay apparatus 2 transmits data, it is possible to prompt the data acquirer to transmit data in a time period during which the charge amount is small (e.g., a time period during which the communication network N1 is not congested) by determining the charge amount as described above.

The network communication section 23 is a wireless communication interface for transmitting data received from the communication device 1 to the communication network N1. The network communication section 23 can transmit and receive data to and from the base station of a portable phone network in accordance with, for example, a Long Term Evolution (LTE) standard.

The network communication section 23 functions as a notification section configured to notify the data processing apparatus 30 of the amount of non-reception data that is data for which a response indicating that data has been received normally has not been received from the data acquisition apparatus 4 until a prescribed period has elapsed from transmission of the data to the data processing apparatus 30, as the amount of non-reception data among amounts of data transmitted to the data processing apparatus 30, on the basis of an instruction of the control section 22. The non-reception data is data that has not been received by the data processing apparatus 30 when communication has failed due to a facility of a communication carrier as in a communication section from the relay apparatus 2 to a core network such as a packet data network gateway (PUW) or a mobility management entity (MME), a communication section from the core network to the data processing apparatus 30, or the like.

The network communication section 23 notifies the data processing apparatus 30 of a clock time at which data for which a response from the data acquisition apparatus 4 has not been received has been transmitted to the data processing apparatus 30. The network communication section 23 may notify the data processing apparatus 30 that data transmission has succeeded when the response from the data acquisition apparatus 4 has been received until the prescribed period has elapsed from the transmission of data to the data processing apparatus 30. At this time, the network communication section 23 may provide a notification of whether data transmission has succeeded at first transmission or whether data transmission has succeeded after retransmission.

Information indicating whether the data communication has succeeded or failed provided through a notification from the network communication section 23 to the data processing apparatus 30 is used when the charge amount determination apparatus 50 determines charge amounts for the contractor and the data acquirer. Details of a process in which the charge amount determination apparatus 50 determines the charge amount on the basis of the success or failure of data communication will be described below.

The storage section 24 includes storage media such as a read only memory (ROM), a random access memory (RAM), and a hard disk. The storage section 24 stores programs to be executed by the control section 22. Also, the storage section 24 stores data received from the communication device 1 in association with a device ID of the communication device 1 and a date and time received from the communication device 1 on the basis of control of the control section 22.

[Configuration of Data Processing Apparatus 30]

Figure 4:
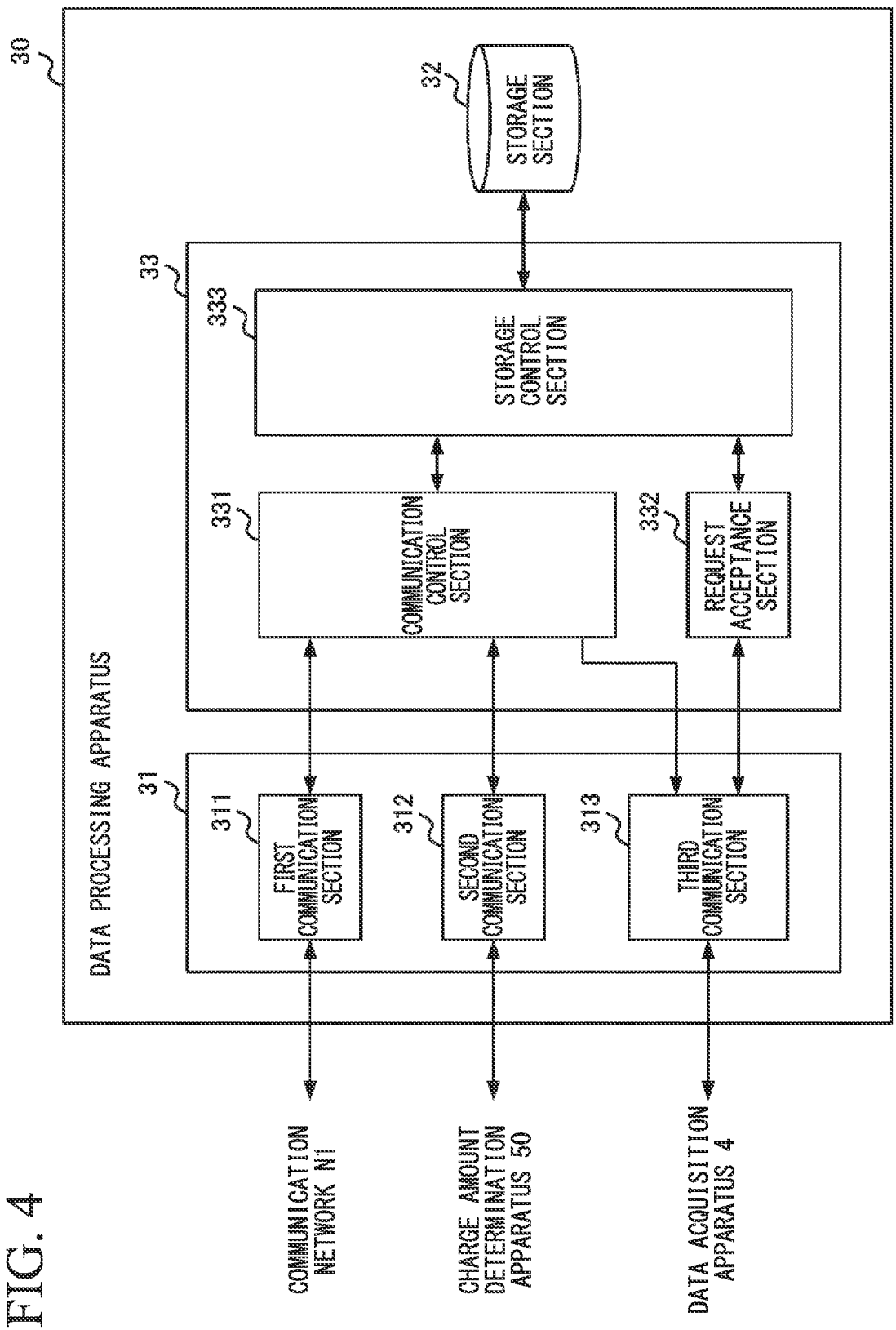
FIG. 4 is a diagram showing a configuration of a data processing apparatus.

FIG. 4 is a diagram showing a configuration of the data processing apparatus 30. The data processing apparatus 30 includes a communication section 31, a storage section 32, and a control section 33.

The communication section 31 includes a first communication section 311, a second communication section 312, and a third communication section 313. The first communication section 311 is a communication interface for transmitting and receiving data to and from the relay apparatus 2 via the communication network N1, and has, for example, a termination interface of a portable phone network. The first communication section 311 may have a local area network (LAN) interface for establishing a connection with the termination apparatus of the portable phone network.

The second communication section 312 has a communication interface for transmitting and receiving data to and from the charge amount determination apparatus 50. The second communication section 312 is, for example, a LAN interface.

The third communication section 313 has a communication interface for transmitting and receiving data to and from the data acquisition apparatus 4 via the communication network N2. The third communication section 313 is, for example, a LAN interface.

The storage section 32 includes storage media such as a ROM, a RAM, and a hard disk. The storage section 32 stores packet data transmitted by the plurality of communication devices 1 transmitted from the relay apparatus 2 in association with a device ID of each communication device 1. Also, the storage section 32 stores a device ID, a relay apparatus ID allocated to the relay apparatus 2, and a contractor ID of the contractor of the relay apparatus 2 in association. Further, the storage section 32 stores a data provision database in which the acquirer ID of the data acquirer who accesses the data processing apparatus 30 via the data acquisition apparatus 4 and the device ID and the application ID of the communication device 1 and the application registered as targets from which the data acquirer acquires data are associated. The storage section 32 may store a data provision database for managing data to be viewed by a plurality of data acquirers and store an individual data provision database created for each data acquirer.

The control section 33 is, for example, a CPU, and executes a program stored in the storage section 32, so that information based on packet data stored in association with the acquirer ID is transmitted to the data acquisition apparatus 4 in response to a request from the data acquisition apparatus 4.

The control section 33 includes a communication control section 331, a request acceptance section 332, and a storage control section 333.

The communication control section 331 controls transmission and reception of data between the relay apparatus 2 and the data acquisition apparatus 4. The communication control section 331 starts the reception of data from the relay apparatus 2 by notifying the relay apparatus 2 capable of communicating with the communication device 1 configured to output data to be provided to the data acquisition apparatus 4 of an access point name (APN) that is an address of a gateway of the communication network N1.

When the request acceptance section 332 has accepted a request from the data acquisition apparatus 4, the communication control section 331 provides data by referring to the data provision database stored in the storage section 32 and transmitting data transmitted by an application indicated in the request received via the communication network N1 to the data acquisition apparatus 4. In the data provision database, the acquirer ID corresponding to the data acquisition apparatus 4 transmitting the data acquisition request and the device ID of the communication device that is a target from which data is provided to the data acquisition apparatus 4 of the acquirer ID are associated. In the data provision database, an application ID of an application that is a target from which data is provided to the data acquisition apparatus 4 of the acquirer ID may further be associated.

The communication control section 331 extracts data output by an application associated with the acquirer ID in the data provision database among various types of data included in the packet data transmitted by the communication device 1 and provides the data acquirer corresponding to the acquirer ID with the extracted data. For example, the communication control section 331 enables the data acquirer to view data by providing the data to the data acquisition apparatus 4 in accordance with access from the data acquisition apparatus 4 logged in by the data acquirer using his/her acquirer ID. When the data is provided to the data acquisition apparatus 4, the communication control section 331 notifies the charge amount determination apparatus 50 of a provision date and time or the amount of provided data in association with the acquirer ID corresponding to the data acquisition apparatus 4 of a provision destination and a device ID and an application ID of the application transmitting the data.

The communication control section 331 may set a time in which data transmission by an application executable by the communication device 1 from the relay apparatus 2 is prohibited, a data transmission interval, a mode for transmitting the presence or absence of data received from the communication device 1, and the like. For example, the communication control section 331 transmits a message for permitting the transmission of data output by an application corresponding to the application ID stored in the storage section 32 in association with the acquirer ID to the data processing apparatus 30 to the relay apparatus 2 that relays data transmitted by the communication device 1.

Also, the communication control section 331 transmits, to the relay apparatus 2 that relays data transmitted by the communication device 1, a message for prohibiting the transmission of data output by an application corresponding to the application ID that is not stored in the storage section 32 in association with the acquirer ID to the data processing apparatus 30. Thereby, because it is possible to prevent data from being transmitted from the relay apparatus 2 even though there is no data acquisition apparatus 4 that acquires the data, the traffic volume of the communication network N1 can be minimized.

Also, the communication control section 331 may output an instruction to the relay apparatus 2 so that data received from a high-priority application is preferentially transmitted to the data processing apparatus 30 by allocating a priority for transmitting data received from the application to the communication network N1 to the relay apparatus 2 according to each application. Thereby, because the relay apparatus 2 can prevent data received from a low-priority application from being transmitted simultaneously with data received from a high-priority application, a traffic volume of the communication network N1 can be equalized.

The request acceptance section 332 accepts a request for selecting a communication device 1 and an application that are targets from which data is acquired from the data acquisition apparatus 4. Specifically, the request acceptance section 332 transmits a list of communication devices 1 and applications that are targets from which data is collected by the data processing apparatus 30 to the data acquisition apparatus 4 via the second communication section 312.

When the data acquirer selects the communication device 1 and the application from which data is desired to be acquired from the list of communication devices 1 and applications displayed via the data acquisition apparatus 4, the data acquisition apparatus 4 transmits a data acquisition request including information (e.g., a device ID and an application ID) for identifying the selected communication device 1 and the selected application and an acquirer ID to the data processing apparatus 30. When the data acquisition request is received from the data acquisition apparatus 4, the request acceptance section 332 performs registration in the data provision database in the storage section 32 by notifying the storage control section 333 of the acquirer ID, the device ID and the application ID included in the data acquisition request.

The request acceptance section 332 may accept requests for selecting the same application to be executed by the same communication device 1 from the plurality of data acquisition apparatuses 4. When the request acceptance section 332 has accepted requests for selecting the same application to be executed by the same communication device 1 from the plurality of data acquisition apparatuses 4, the communication control section 331 provides the plurality of data acquisition apparatuses 4 with packet data transmitted by the application indicated in the request among items of packet data received via the communication network N1.

The storage control section 333 writes data to the storage section 32 or reads data stored in the storage section 32 on the basis of instructions from the communication control section 331 and the request acceptance section 332. For example, when a notification of a data acquisition request is received from the request acceptance section 332, the storage control section 333 causes the storage section 32 to store the device ID and the application ID in association with the acquirer ID included in the data acquisition request. Also, when a notification indicating that packet data transmitted by the communication device 1 has been provided to the data acquisition apparatus 4 is received from the communication control section 331, the storage control section 333 causes the storage section 32 to store the device ID, the application ID, and the acquirer ID in association.

[Configuration of Charge Amount Determination Apparatus 50]

Figure 5:
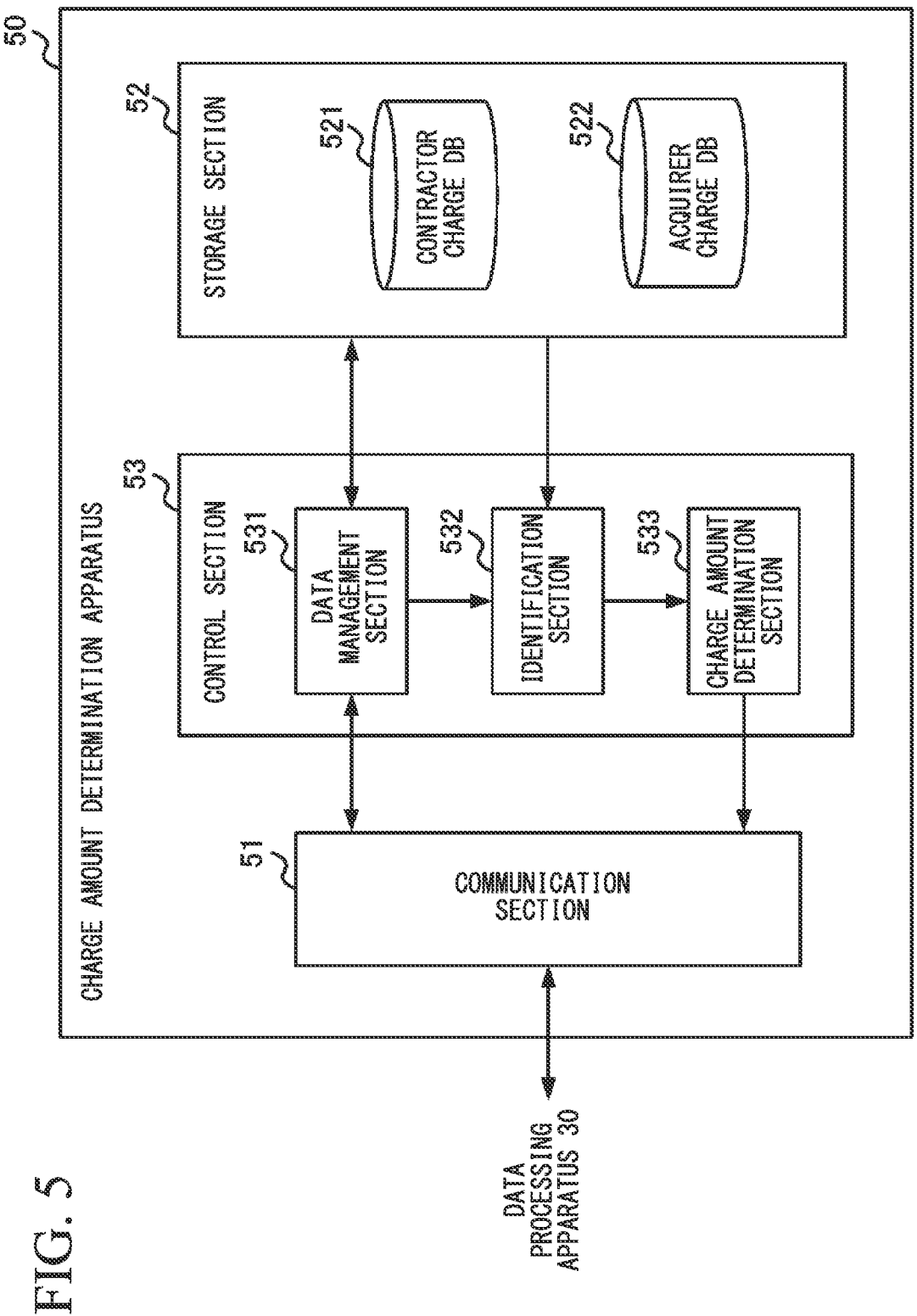
FIG. 5 is a diagram showing a configuration of a charge amount determination apparatus.

FIG. 5 is a diagram showing a configuration of the charge amount determination apparatus 50. The charge amount determination apparatus 50 includes a communication section 51, a storage section 52, and a control section 53.

The communication section 51 is a communication interface for transmitting and receiving data to and from the data processing apparatus 30, and has, for example, a LAN interface.

(Charge Database)

The storage section 52 includes storage media such as a ROM, a RAM, and a hard disk. The storage section 52 stores programs to be executed by the control section 53. Also, the storage section 52 includes a contractor charge database 521 and an acquirer charge database 522. In the contractor charge database 521, the contractor ID allocated to the contractor of the relay apparatus 2, the relay apparatus ID of the relay apparatus 2, and the device ID of the communication device 1 from which the relay apparatus 2 receives data are associated. In the contractor charge database 521, an application ID of an application executable by the communication device 1 may further be associated.

FIGS. 6A and 6B are diagrams showing examples of records stored in the contractor charge database 521. In FIG. 6A, a contractor ID, a relay apparatus ID of the relay apparatus 2 for which a contractor corresponding to the contractor ID makes a contract with a communication carrier, and a device ID of the communication device 1 from which the relay apparatus 2 can receive packet data are associated. It can be seen that a contractor with a contractor ID of 00001 has made a contract for the relay apparatus 2 configured to relay data output by communication devices 1 of device IDs of 1001, 1002, 1003, 1004, 1005, and the like.

In FIG. 6B, for each contractor, the number of days of occurrence of communication by the communication device 1 that transmits data via the relay apparatus 2 for which a contract has been made by a contractor is associated with a communication traffic volume of data received via the relay apparatus 2. The number of days of occurrence of communication is the number of days the data has been transmitted from the communication device 1 for one month that is a unit period of charging. The data communication traffic volume is the amount of data (e.g., the number of bytes) received from the communication device 1 within the unit period.

According to FIG. 6B, it can be seen that the number of days the data has been transmitted from the communication device 1 having a device ID of 1001 associated with a contractor having a contractor ID of 00001 is 30. The total number of days of occurrence of communication of all communication devices 1 registered by the contractor having the contractor ID of 00001 is 116 and a charge amount for the contractor is, for example, the amount of money corresponding to 116 days. The charge amount for the contractor may be determined in accordance with a total amount of data received from the relay apparatus 2 within the unit period or a total communication time required for receiving packet data from the relay apparatus 2.

FIG. 7 is a diagram showing an example of records stored in the acquirer charge database 522. In the acquirer charge database 522, an acquirer ID corresponding to the data acquisition apparatus 4, a device ID, an application ID, and the amount of acquired data that is the amount of data (the number of bytes) acquired by the data acquisition apparatus 4 for one month are associated. According to FIG. 7, it can be seen that a data acquirer with an acquirer 113 of S0001 can acquire data output by an application with an application ID of a51 and an application with an application ID of a52 executable by a communication device 1 with a device ID of 1001 and data output by the application with the application ID of a51 and the application with the application ID of a52 executable by a communication device 1 with a device ID of 1002.

A data acquirer with an acquirer ID of S0003 is associated with the application with the application ID of a51 and the application with the application ID of a52 executable by the communication device 1 with the device ID of 1001. Thereby, it can be seen that a plurality of data acquirers acquire data output by the same application of the same communication device 1. The charge amount determination apparatus 50 refers to the records shown in FIG. 7 and determines the charge unit for each acquirer ID.

(Process of Charge Amount Determination Apparatus 50)

Returning to FIG. 5, the control section 53 is, for example, a CPU. By executing the program stored in the storage section 52, the control section 53 functions as a data management section 531, an identification section 532, and a charge amount determination section 533.

The data management section 531 manages data within the acquirer charge database 522. For example, the data management section 531 updates a device ID and an application ID associated with an acquirer ID when a communication device 1 and an application that are targets from which the data acquirer acquires data from the data processing apparatus 30 have changed. When a notification related to a date and time when data has been provided to the data acquisition apparatus 4 and the amount of provided data is received from the data processing apparatus 30, the data management section 531 updates the amount of acquired data in the acquirer charge database 522.

The identification section 532 identifies, for each contractor ID, the total number of days the data processing apparatus 30 has received packet data from the relay apparatus 2 for which a contractor of a contractor ID has made a contract, a total time for which the relay apparatus 2 has performed communication, or a total amount of data received from the relay apparatus 2, during a prescribed unit time. Also, the identification section 532 identifies the total number of days or the total number of times the data processing apparatus 30 has received packet data output by the communication device 1 registered as a target from which each data acquirer acquires data from the relay apparatus 2 or a total amount of data received from the relay apparatus 2 during a prescribed unit period for each acquirer ID. The identification section 532 may further identify the amount of data output by the application of the communication device 1 selected as a target from which each data acquirer acquires data.

For example, to identify the number of days of occurrence of communication corresponding to each contractor, the identification section 532 identifies the total number of days of communication by referring to records within the contractor charge database 521 shown in FIG. 6B and calculating a sum of the number of days occurrence of communication of a plurality of communication devices 1 with device IDs registered in association with each contractor on the basis of the number of days of occurrence of communication for each device ID. When the records of FIG. 6B include a communication time, the identification section 532 calculates a total communication time by calculating a sum of communication times of the plurality of communication devices 1 with the device IDs registered in association with each contractor. When the records of FIG. 6B include a data communication traffic volume, the identification section 532 identifies a total data communication traffic volume by calculating a sum of data communication traffic volumes of the plurality of communication devices 1 with the device IDs registered in association with each contractor.

Also, the identification section 532 identifies a total data communication traffic volume for each data acquirer by referring to records within the acquirer charge database 522 shown in FIG. 7 and calculating a total amount of data provided to the data acquisition apparatus 4 of each data acquirer. For example, the identification section 532 identifies that a data communication traffic volume corresponding to a data acquirer with an acquirer ID of S0001 is 3000+2000+5200+3400=13600 bytes.

The charge amount determination section 533 is configured to determine a charge amount for each contractor on the basis of the total number of days of occurrence of communication, the total communication time, or the total data communication traffic volume for each contractor identified by the identification section 532. For example, when the last day of the unit period for calculating the charge amount is reached, the charge amount determination section 533 determines a charge amount by multiplying a data communication traffic volume, identified by the identification section 532, of the relay apparatus 2 for which a contract has been made by the contractor by a unit price. The charge amount determination section 533 transmits a charge amount in association with the contractor ID to a charge management server (not shown) that issues a bill for the contractor.

Also, the charge amount determination section 533 can also charge, to the data acquirer, at least a part of a communication fee required for transmitting data from the communication device 1 to the data management apparatus 3. In this case, the charge amount determination section 533 determines a charge amount for the data acquirer the basis of the type and the amount of data provided to the data acquirer. Specifically, the charge amount determination section 533 determines a charge amount for an acquirer ID on the basis of a combination of a device ID and an application ID associated with the acquirer ID in the acquirer charge database 522. For example, when the last day of the unit period for calculating the charge amount is reached, the charge amount determination section 533 determines the charge amount for the acquirer ID on the basis of at least either one of the number of device IDs and the number of application IDs associated with the acquirer ID. Thereby, when the data acquirer acquires only data output by some applications executable by some communication devices 1, the charge amount determination section 533 can determine a charge amount in accordance with the amount of acquired data.

Specifically, the charge amount determination section 533 may deters cine a charge amount by multiplying the number of device IDs associated with the acquirer ID by a unit price for the use of the communication device 1 or may determine a charge amount by multiplying the number of application IDs associated with the acquirer ID by a unit price for the use of the application. The charge amount determination section 533 may determine a charge amount by summing unit prices determined for combinations of device IDs and application IDs.

Also, the charge amount determination section 533 may determine a charge amount on the basis of the number of times the data has been received or a received data volume (the number of bytes) within a prescribed period from the application corresponding to the application ID associated with the acquirer ID. Thereby, the charge amount determination section 533 can determine a charge amount according to a degree to which the data acquirer has received a benefit using the communication network N1 and the communication network N2.

Also, the charge amount determination section 533 may receive a notification of a priority of an application provided to the relay apparatus 2 from the communication control section 331 and determine a charge amount for the data acquirer on the basis of the priority of the application corresponding to the application ID associated with the acquirer ID. In this case, the charge amount determination section 533 sets a charge amount for the number of times the communication control section 331 has provided the data acquisition apparatus 4 with data output from an application set to a high priority or the amount of data provided from the application so that the charge amount is greater than a charge amount for data output from an application set to a low priority. Thereby, because the number of applications set to a high priority by the data acquirer is not excessively increased, it is possible to prevent traffic volumes of the communication network N1 and the communication network N2 from being excessively increased.

After determining a temporary charge amount for the contractor, the charge amount determination section 533 may determine a final charge amount for the contractor by subtracting a part of the charge amount for the data acquirer from the temporary charge amount for the contractor. When a total amount of money of some of charge amounts for a plurality of data acquirers is larger than the temporary charge amount for the contractor, the charge amount determination section 533 determines the amount of money obtained by subtracting the temporary charge amount from the total amount of money as the amount of money to be paid for the contractor.

Thereby, the contractor is motivated to install the communication device 1 having an application capable of outputting data desired to be acquired by many data acquirers in an appropriate place. Also, because the contractor installs many communication devices 1 for a communication carrier and therefore the number of data acquirers that acquires data output by the communication device 1 via the data processing apparatus 30 increases, it is possible to increase the profit by increasing a charge amount for the data acquirer.

Also, when the data acquirer is using a specific application or a specific type of application (e.g., an application for use recommended by the communication carrier), the charge amount determination section 533 may subtract a predetermined amount of money from a fixed charge or increase a data communication traffic volume usable at a fixed charge. Also, the charge amount determination section 533 may reduce the charge amount when the number of communication devices 1 or applications with which one relay apparatus 2 can communicate is smaller than a prescribed number.

[Charge Based on Success/Failure of Communication Network]

The charge amount determination section 533 may determine a charge amount for a contractor on the basis of the data communication traffic volumes of one or more communication devices 1 whose data communication traffic volumes within a prescribed period have exceeded a prescribed value among a plurality of communication devices 1. For example, in the example shown in FIG. 6B, the number of days of occurrence of communication of a communication device 1 with a device ID of 1003 is three and communication is hardly performed. In this case, there is a possibility that the communication device 1 with the device ID of 1003 has failed. Therefore, the charge amount determination section 533 determines a charge amount on the basis of 113 days that is a period of the data communication traffic volume identified by excluding the number of days of occurrence of communication corresponding to the communication device 1. If the number of days of occurrence of communication is less than the prescribed number of days and the amount of data in communication or a total amount of data in a plurality of operations of communication that have occurred is less than a prescribed amount, the charge amount determination section 533 may not charge any fee.

A situation in which the number of days of occurrence of communication is abnormally small as described above can be caused, for example, even when device data output by the communication device 1 does not reach the data processing apparatus 30 due to a failure in a wireless communication channel between the relay apparatus 2 and the communication network N1 or a communication circuit between the communication network N1 and the data processing apparatus 30. Therefore, the charge amount determination section 533 may determine a charge amount for the contractor or the data acquirer on the basis of data communication traffic volumes of one or more communication devices 1 having communication success rates exceeding a prescribed value within a prescribed period among the plurality of communication devices 1.

For example, when the charge amount is determined, the charge amount determination section 533 acquires the number of transmissions that is the number of times the transmission of packet data has been attempted from the relay apparatus 2 in association with a device ID and a relay apparatus ID. Then, the charge amount determination section 533 calculates a communication success rate according to a ratio of the amount of packet data, which is actually received by the data processing apparatus 30 and registered in the contractor charge database 521, to the number of transmissions acquired from the relay apparatus 2 and sums only data communication traffic volumes corresponding to communication devices 1 having the communication success rates greater than a prescribed value. That is, the charge amount determination section 533 excludes data communication traffic volumes corresponding to communication devices 1 having the communication success rates less than or equal to the prescribed value from the calculation of the charge amount.

Thereby, because it is possible to prevent a fee from being charged regardless of the fact that the data acquisition apparatus 4 has not collected scheduled device data, it is possible to prevent the contractor or the data acquirer from being dissatisfied. Also, the charge amount determination section 533 may acquire the number of failures of packet data transmission from the relay apparatus 2 after the relay apparatus 2 is in a state in which communication is possible and calculate a communication success rate on the basis of the number of times the packet data can be acquired and the number of failures of the packet data transmission. In the present specification, the failure of data transmission indicates that transmitted data has not arrived at a transmission destination and the success of data transmission indicates that transmitted data has arrived at a transmission destination.

Also, the charge amount determination section 533 may transmit checking data for checking a situation to at least some of a plurality of communication devices 1 (e.g., communication devices 1 from which the data acquirer collects information) and determine a charge amount by excluding a communication device 1, from which response data has not been transmitted for the checking data until a prescribed time has elapsed from the transmission of the checking data, from charging targets. Thereby, because the charge amount determination section 533 can exclude a failed communication device 1 from charging targets, it is possible to prevent the contractor or the data acquirer from being dissatisfied.

In this manner, when the charge amount determination section 533 transmits the checking data for checking the situation of the communication device 1, the charge amount determination section 533 may determine a charge amount by excluding a period, from an expiration date of the prescribed period to a date of occurrence of immediately previous communication or a date of reception of immediately previous response data, from charging targets with respect to a communication device 1 from which response data has not been transmitted for the checking data until a prescribed time has elapsed from the transmission of the checking data. Thereby, because the charge amount determination section 533 can prevent a fee from being charged for a period during which the communication device 1 does not operate, it is possible to prevent the contractor or the data acquirer from being dissatisfied.

The charge amount determination section 533 may determine a charge amount for the contractor on the basis of the amount of data transmitted by the network communication section 23 and the amount of non-reception data that is the amount of data that has not been received by the data acquisition apparatus 4 among items of data transmitted by the relay apparatus 2. Although the charge amount determination section 533 can use, for example, the amount of non-reception data indicated in a notification from the relay apparatus 2, the amount of non-reception data identified on the basis of the presence or absence of a response from the data acquisition apparatus 4 may be used in the data processing apparatus 30.

The charge amount determination section 533 determines at least one of the charge amount for the contractor and the charge amount for the data acquirer by subtracting the amount of money corresponding to the amount of non-reception data from a standard charge amount corresponding to the amount of data transmitted by the network communication section 23. Thereby, when data transmitted by the relay apparatus 2 has not arrived at the data acquisition apparatus 4 and the transmitted data is not useful for the data acquirer, the charge amount determination section 533 can prevent the contractor or the data acquirer from being dissatisfied because a fee for data that has not arrived at the data acquisition apparatus 4 is not charged.

At this time, the charge amount determination section 533 may further determine the charge amount on the basis of a clock time at which the data transmission has failed provided through a notification from the network communication section 23 of the relay apparatus 2. For example, the charge amount determination section 533 determines a charge amount on the basis of a degree of congestion of the communication network N1 at the clock time of the failure.

Specifically, when a clock time at which the network communication section 23 has transmitted the data is included in a time period during which the communication network N1 is congested, the charge amount determination section 533 decreases the amount of money to be subtracted from a standard charge amount in accordance with the amount of non-reception data as compared with a case in which the clock time is included in other time periods. Thereby, it is possible to motivate the data acquirer to acquire data during a time period when the communication network N1 is not congested.

The charge amount determination section 533 may determine the charge amount on the basis of a cause of non-reception of a response from the data acquisition apparatus 4 or a response from an apparatus provided between the data management apparatus 3 and the data acquisition apparatus 4 until a prescribed period has elapsed from transmission of the data to the data processing apparatus 30 in the relay apparatus 2. For example, when data communication has failed due to the congestion or failure of the communication network N1 or the communication network N2, the charge amount determination section 533 subtracts the amount of money for data of the communication failure from the standard charge amount. Thereby, the communication carrier can prevent a fee from being charged to the user in despite of the communication failure occurring in the communication network N1 or the communication network N2 managed by the communication carrier. On the other hand, when the reason that the relay apparatus 2 has failed to receive the response from the data processing apparatus 30 until the prescribed period has elapsed from the transmission of data to the data processing apparatus 30 exists in the data acquisition apparatus 4, the charge amount determination section 533 determines the charge amount without subtracting an amount of money corresponding to the amount of non-reception data from the standard charge amount. Thereby, the communication carrier can prevent the profit from being reduced when the communication fails due to the data acquisition apparatus 4.

The charge amount determination section 533 may determine a charge amount for the data acquirer on the basis of the amount of non-reception data in data transmitted by an application corresponding to an application ID stored by the acquirer charge database 522 in association with an acquirer ID. The charge amount determination section 533 determines a charge amount by subtracting an amount of money corresponding to the amount of non-reception data determined for each application from the standard charge amount based on data transmitted from the communication device 1 and the application registered as targets from which the data acquirer acquires data. For example, when communicate of data from an application with a high priority set by the user and a large standard charge amount, the charge amount determination section 533 increases the amount of money to be subtracted as compared with a case in which the communicate of data from an application with a low priority set by the user and a small standard charge amount. Thereby, it is possible to reduce dissatisfaction of the data acquirer when data output by the application with high importance cannot be received.

Also, the charge amount determination section 533 may exclude data related to whether the communication has failed or succeeded transmitted from the relay apparatus 2 from charging targets. Thereby, because the charge amount determination section 533 does not charge a fee for data that is not used by the data acquirer, it is possible to prevent the contractor or the data acquirer from being dissatisfied.

[Burden Rate of Data Acquirer]

Although the charge amount determination section 533 determines a charge amount for the data acquirer on the basis of the amount of acquired data provided to the data acquisition apparatus 4 in the above description, the charge amount determination section 533 may determine a charge amount corresponding to an acquirer ID on the basis of the amount of acquired data and a burden rate that is a rate of a burden of a communication fee corresponding to the amount of data acquired by the data acquisition apparatus 4.

For example, the charge amount determination section 533 determines the burden rate on the basis of the number of users of the application indicated in a data acquisition request at a point in time when the request acceptance section 332 has accepted the data acquisition request for acquiring data from the data acquisition apparatus 4 and registers the determined burden rate in the acquirer charge database 522. After a temporarily determined burden rate is transmitted to the data acquisition apparatus 4 via the data processing apparatus 30, the charge amount determination section 533 may validate the burden rate by registering the burden rate in the acquirer charge database 522 on condition that a notification for granting the burden rate has been received from the data acquisition apparatus 4.

FIG. 8 is a diagram showing an example of the acquirer charge database 522 including the amount of charging target data calculated on the basis of the burden rate. Data output by an application with an application ID of a51 executed by a communication device 1 with a device ID of 1001 is transmitted to the data acquisition apparatus 4 of a data acquirer with an acquirer ID of S0001 and the data acquisition apparatus 4 of a data acquirer with an acquirer ID of S0003. In this case, because two data acquirers have acquired the data output by the application with the application ID of a51, the burden rate of each of the data acquirer with the acquirer ID of S0001 and the data acquirer with the acquirer ID of S0003 becomes 50%. An amount of charging target data becomes 1,500 bytes obtained by multiplying the amount of acquired data by the burden rate.

In this manner, because the charge amount determination section 533 determines a burden rate of each data acquirer in accordance with the number of data acquirers who acquire the data output by the application of the communication device 1 and therefore a charge amount imposed on the data acquirer is decreased, the number of data acquirers who wish to acquire data increases. As a result, furthermore, a virtuous circle in which the burden rate of each data acquirer is reduced is created and there are merits for three parties of the communication carrier, the contractor, and the data acquirer.

Also, the charge amount determination section 533 may determine a charge amount on the basis of a range of the data acquirer who can acquire data output by the application of the communication device 1. For example, a contractor of the relay apparatus 2 can select a desired mode from any mode such as (1) a mode in which anyone can acquire data output from the communication device 1, (2) a mode in which the data acquirer receiving a grant of the contractor can acquire data output from the communication device 1, or (3) a mode in which only the contractor can acquire data output from the communication device 1. The data management apparatus 3 may acquire a set mode via the data acquisition apparatus 4 of the contractor and the charge amount determination section 533 may determine a charge amount by referring to a fee table corresponding to the mode.

Also, when the data management apparatus 3 has received a request for setting a transmission clock time of data from the communication device 1. (e.g., whether to perform transmission at 00:00:00 or whether to perform transmission at 00:01:00), a data transmission interval, a priority of data, and the like from the data acquisition apparatus 4, a fee per amount of data may be displayed for each setting condition related to data transmission. Thereby, because the data acquirer can ascertain a fee for each setting condition related to data transmission by accessing the data acquisition apparatus 4, it is possible to prevent communication traffic from being rapidly increased in a specific time in the data communication system S.

[Communication Sequence]

Figure 9:
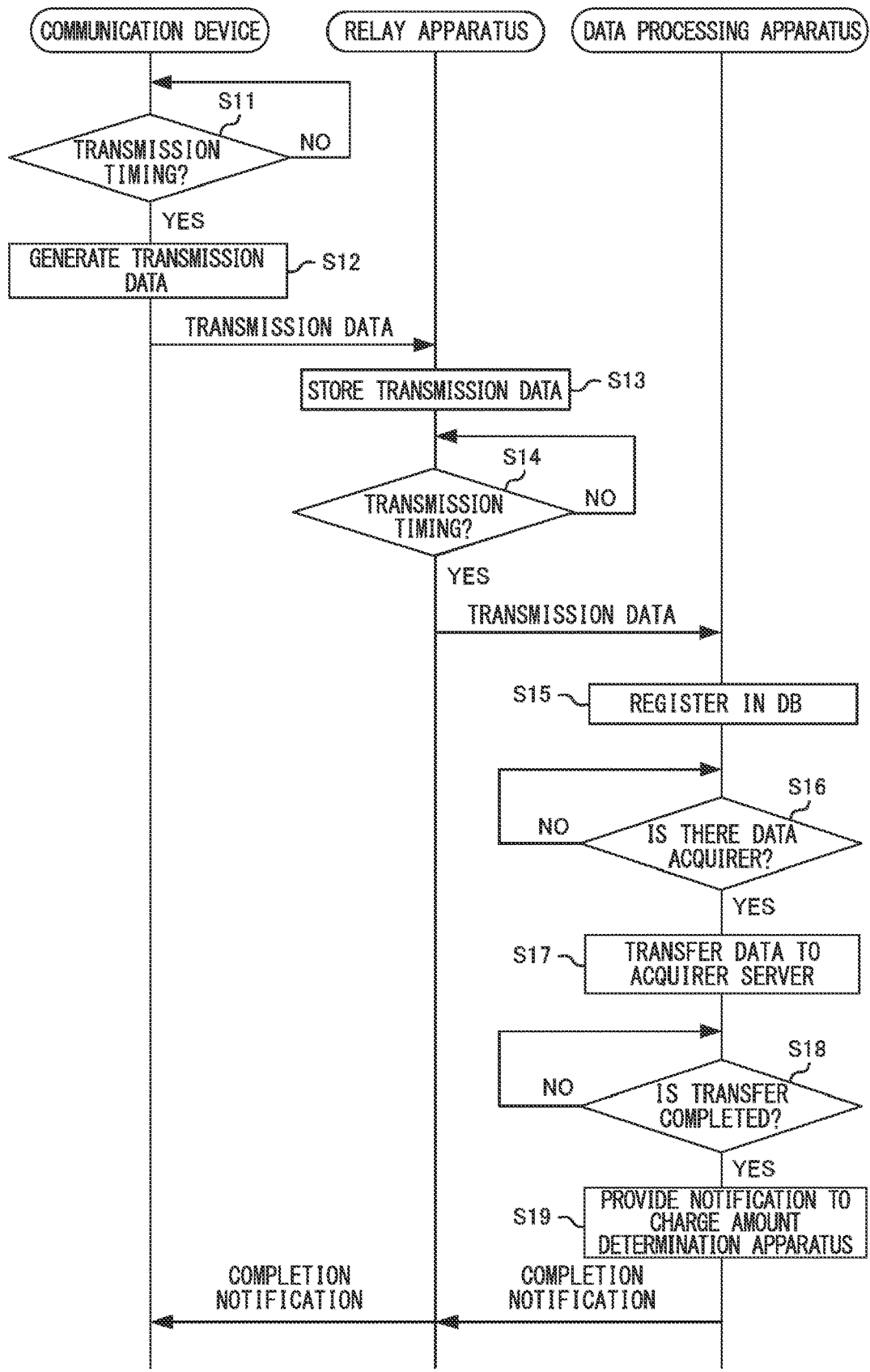
FIG. 9 is a diagram showing a communication sequence in a charge amount determination system.

FIG. 9 is a diagram showing a communication sequence in the data communication system S.

First, when a timing at which collected information is transmitted is reached (YES in S11), the communication device 1 generates transmission data (S12) and transmits the transmission data to the relay apparatus 2.

When the transmission data is received, the relay apparatus 2 stores the received transmission data in the storage section 24 (S13). When a preset transmission clock time is reached (YES in S14), the relay apparatus 2 transmits the transmission data read from the storage section 24 to the data processing apparatus 30.

When the transmission data is received in the data processing apparatus 30, the control section 33 registers the received transmission data in the storage section 32 in association with an acquirer ID (S15). Thereafter, when a timing at which data is provided to the data acquisition apparatus 4 is reached (YES in S16), the control section 33 provides the data registered in the storage section 32 to the data acquisition apparatus 4 (S17). For example, the control section 33 transmits data to the data acquisition apparatus 4 in accordance with reception of a data acquisition request from the data acquisition apparatus 4. The control section 33 may transmit the data t the data acquisition apparatus 4 at a timing when the preset clock time has been reached.

Subsequently, when the control section 33 receives a notification indicating the reception of data from the data acquisition apparatus 4 to which the data has been provided and the provision of the data is completed (YES in S18), the control section 33 notifies the charge amount determination apparatus 50 that the provision of the data is completed (S19). At that time, the control section 33 notifies the charge amount determination apparatus 50 of an acquirer ID corresponding to the data acquisition apparatus 4 for which the data provision has been completed and information indicating the amount of provided data. Thereafter, the storage section 32 notifies the communication device 1 that the data provision has been completed via the relay apparatus 2.

The charge amount determination apparatus 50 registers information, which indicates the amount of data indicated in the notification, in the contractor charge database 521 and the acquirer charge database 522. Then, a charge amount is calculated for each of the contractor ID and the acquirer ID at a prescribed timing.

[Charge Based on Application]

An example in which the charge amount determination section 533 determines the charge amount for the contractor on the basis of the number of days of occurrence of communication in the plurality of communication devices 1 has been described above. The charge amount determination section 533 may determine the charge amount for the contractor on the basis of the number of days of occurrence of communication for each application from which the data acquisition apparatus 4 acquires data.

In this case, the storage section 52 stores a contractor ID, a device ID, and an application ID in association. Then, the identification section 532 identifies data communication traffic volumes for each application by a plurality of communication devices 1 within a prescribed period, and the charge amount determination section 533 determines a charge amount on the basis of the data communication traffic volumes identified for each application.

FIG. 10 is a diagram showing a process when the charge amount determination section 533 determines a charge amount for the contractor on the basis of an application registered as a target from which the data acquirer acquires data. FIG. 10 shows records of the contractor charge database 521 indicating the number of days the data output by an application for transmitting data via the relay apparatus 2 of a contractor with a contractor ID of 00001 has been provided to the data acquisition apparatus 4.

In FIG. 10, the device ID, the application ID, and the number of days of occurrence of communication are associated. In FIG. 10, the device ID of the communication device 1 used by a data acquirer with an acquirer ID of 00001 and the application ID of the application used in each communication device 1 are shown.

In the example of FIG. 10, the number of days the data output by an application with an application ID of 1 executed by the communication device 1 with the device ID of 1001 has been transmitted is 30. Also, the number of days the data output by an application with an application ID of 2 executed by the communication device 1 with the device ID of 1001 has been transmitted is 8. The charge amount determination section 533 calculates the number of days of occurrence of communication used for calculating a charge amount for the data acquirer with the acquirer ID of 00001 as 199 by summing numbers in a field indicating the number of days of occurrence of communication in FIG. 10 and determines the charge amount on the basis of the calculated number of days.

Also, when the relay apparatus 2 has simultaneously transmitted data output from a plurality of cached applications, the charge amount determination section 533 may charge a fee for each of a plurality of applications by proportionally dividing the charge amount on the basis of the number of applications included in transmitted data or charge a fee for one representative application of a plurality of applications. Also, when a plurality of communication services (e.g., LTE, 5G, WiMAX (registered trademark), and satellite communication) have been used, the charge amount determination section 533 may change the charge amount according to a used communication service.

Also, the charge amount determination section 533 may determine a charge amount on the basis of only an application that is in an active state in which data can be transmitted among applications executable by the communication device 1.

[Advantageous Effects of Data Communication System S]

As described above, in the data communication system S, the storage section 52 stores device identification information of each of a plurality of communication devices 1 in association with charge identification information including either contractor identification information of a contractor of a contract for using the relay apparatus 2 that is configured to transfer a plurality of data items to the data management apparatus 3 or acquirer identification information of the data acquirer who acquires the data from the data management apparatus 3. Also, the charge amount determination section 533 determines a charge amount for each item of the charge identification information on the basis of data communication traffic volumes corresponding to data output from the communication devices 1 of one or more device identification information items stored in association with the charge identification information. Thereby, the data communication system S can determine, as an appropriate amount of money, a charge amount in data processing in which data is transmitted from the relay apparatus 2, which is configured to collect the data from the communication device 1, to a server via the communication network N1.

[Advantageous Effects of Data Communication System S]

The relay apparatus 2 configured to collect data transmitted by a plurality of communication devices 1 and transmit the collected data to the data management apparatus 3 via the communication network N1 is used so that the data transmitted from the communication device 1 is collected in the server. In this case, as in a conventional portable phone service, when a fee is charged for only a communication traffic volume for the relay apparatus 2 using the mobile phone network N1, a fee for the use of the relay apparatus 2 is charged regardless of the number of communication devices 1 connected to the relay apparatus 2 used by the user or a communication traffic volume of the communication device 1. Therefore, there is a problem in that an actual result that the user uses the communication device 1 is hardly reflected in a charge and the user's satisfaction degree is lowered. According to the above-described embodiment, it is possible to determine a charge amount when a contractor of a communication service uses a large number of communication devices 1 as an appropriate amount of money.

That is, as described above, in the data communication system S, the identification section 532 identifies a data communication traffic volume corresponding to the amount of transmission in which the relay apparatus 2 of the contractor making a contract using the communication carrier and the communication network 1 has transmitted a plurality of data items output by the plurality of communication devices 1 within a prescribed period. Also, the charge amount determination section 533 determines the charge amount for the contractor on the basis of the data communication traffic volume identified by the identification section 532. Thereby, the data communication system S can determine a charge amount when a contractor for a communication service uses a large number of communication devices as an appropriate amount of money according to the amount of the use of the communication network N1.

[Advantageous Effects of Data Communication System S]

The relay apparatus 2 configured to collect data transmitted by a plurality of communication devices 1 and transmit the collected data to the server via a communication network (communication circuit) N1 is used so that the data transmitted from the communication devices 1 are collected in the server. In this case, in the past, a fee for the use of the communication network N1 was charged to a contractor making a contract for using the communication network N1 in order to use the relay apparatus 2. However, when the contractor has not used the collected data, there is a problem in that a fee is charged even though the contractor has not used the communication network N1. According to the embodiment described above, it is possible to charge a fee to the acquirer of the data transmitted via the communication network N1.

That is, as described above, in the data communication system S, an acquirer ID of a data acquirer who acquires data output by the communication device 1 and a device ID of a communication device 1 and an application ID of an application registered as targets from which the data acquirer acquires data are associated in the acquirer charge database 522. Then, the charge amount determination section 533 determines a charge amount for a data acquirer receiving the provision of packet data output from the application of the communication device 1 registered in association with the acquirer ID among a plurality of packet data items received from the relay apparatus 2 by the data processing apparatus 30. Thereby, the communication carrier that provides the communication network N1 used by the relay apparatus 2 for data transmission can charge a fee to a data acquirer who receives the benefit by acquiring data as well as a contractor of the relay apparatus 2.

[Advantageous Effects of Data Communication System S]

The server receives data transmitted by the communication device 1 via the relay apparatus 2 connected to the communication network and transfers the received data to the user's device. In this case, if the charge amount for the user is determined on the basis of the amount of data transmitted through the communication network N1, there is a problem in that an error occurs during communication and a fee is charged even though the user cannot acquire data. According to the embodiment described above, it is possible to charge a fee corresponding to the amount of data acquired by the user.

That is, as described above, in the data communication system S, the contractor charge database 521 in which a device ID of each of the plurality of communication devices 1 and a contractor ID of a contractor making a contract for using the relay apparatus 2 for transferring a plurality of device data items to the data management apparatus 3 are stored in association is managed. The data management apparatus 3 transmits data transmitted by the relay apparatus 2 to a prescribed data acquisition apparatus 4. Then, the charge amount determination section 533 determines a charge amount for the contractor on the basis of the amount of data received from the communication device 1 corresponding to a device ID and the amount of non-reception data that has not been received among items of data transmitted by the relay apparatus 2. Thereby, the data communication system S can charge a fee according to the amount of data acquired by the data acquirer without charging a fee for data of failed communication.

MODIFIED EXAMPLE 1

[When Communication Device 1 Moves]

An example in which a communication device 1 and a relay apparatus 2 that become targets from which data is provided to the data acquisition apparatus 4 are determined according to a request from the data acquisition apparatus 4 has been described above. On the other hand, when the communication device 1 and the relay apparatus 2 move, the communication control section 331 may perform switching for the data acquisition apparatus 4 of a destination to which data is provided on the basis of positions of the communication device 1 and the relay apparatus 2 that become targets from which data is provided to the data acquisition apparatus 4.

For example, the communication device 1 and the relay apparatus 2 are assumed to be mounted on a vehicle. The data acquirer is assumed to be a company that operates a gas station (hereinafter referred to as a gas station). The gas station has a need to acquire remaining amount of gasoline of a vehicle within a prescribed range from the position of the gas station and to transmit advertisement data to the vehicle whose remaining amount is smaller than a prescribed amount.

In this case, the communication control section 331 determines a data acquisition apparatus 4 for providing data on the basis of a position of the communication device 1 at a point in time at which data output by the application has been received or a clock time at which the first communication section 311 has received data. Then, the third communication section 313 provides the data output by the application to the data acquisition apparatus 4 determined by the communication control section 331.

For example, the storage section 32 stores position information registered in association with the data acquisition apparatus 4 and the communication control section 331 selects a data acquisition apparatus 4 corresponding to position information indicating a position within a prescribed range from a position of a vehicle equipped with the communication device 1. Then, the communication control section 331 provides data indicating the remaining amount of gasoline as data output by the application of the communication device 1 to the selected data acquisition apparatus 4.

When advertisement data is received from the data acquisition apparatus 4 receiving the provided data via the third communication section 313, the communication control section 331 transmits the received advertisement data to the communication device 1 receiving data indicating the remaining amount of gasoline via the first communication section 311, the communication network N1, and the relay apparatus 2. The communication device 1 operates in conjunction with a car navigation system of a vehicle and displays the received advertisement data on a display of a car navigation system or a communication terminal such as a smartphone of a user registered in advance.

The communication control section 331 may provide a plurality of data items output by a plurality of applications executed by the communication device 1 to the data acquisition apparatus 4 for which a position in a range differing according to each application from a position of the communication device 1 is registered. For example, the communication control section 331 transmits data output by an application that outputs the remaining amount of gasoline to the data acquisition apparatus 4 registered at a position within a first distance from the position of the communication device 1 and transmits data output by an application that outputs an in-vehicle temperature to the data acquisition apparatus 4 registered at a position within a second distance shorter than the first distance from the position of the communication device 1. Thereby, the data acquirer is a vehicle in a range suitable for a type of advertisement data desired to be delivered by the data acquirer and can deliver the advertisement data to a vehicle having a state suitable for the delivery of the advertisement data.

In this manner, when data from the moving communication device 1 is provided to the data acquisition apparatus 4, the charge amount determination section 533 may determine a charge amount in association with a position of the communication device 1 at a point in time at which data output by an application has been received by the first communication section 311 or a clock time at which the first communication section 311 has received data. For example, the charge amount determination section 533 increases the charge amount as the position of the communication device 1 approaches a position registered in association with the data acquisition apparatus 4. When a clock time at which the first communication section 311 has received data is included in a high-priority time period (e.g., a time period in which the number of users of the gas station is small), the charge amount determination section 533 may increase the charge amount as compared with a case in which data has been received at other clock times.

Also, when data from the moving communication device 1 is provided to the data acquisition apparatus 4 via a plurality of portable phone base stations of the communication network N1, the charge amount determination section 533 may determine the charge amount on the basis of the number of used base stations.

Also, because a probability that data transmitted by the communication device 1 will not reach a transmission destination when the communication device 1 moves is higher than that when the communication device 1 does not move, the charge amount determination section 533 may be configured so that a process of reducing the charge amount in accordance with a failure in data transmission is not performed. Also, the charge amount determination section 533 may reduce the amount of money that is subtracted from the charge amount in accordance with the failure of the data transmission when the communication device 1 moves as compared with a case in which the communication device 1 does not move.

Also, the communication device 1 may include a means for detecting its own speed (e.g., an acceleration sensor) and the communication device 1 may notify the data management apparatus 3 of its own speed. Then, when the speed of the notification is higher than or equal to a prescribed speed, the charge amount determination section 533 may reduce the amount of money that is subtracted from the charge amount in accordance with a failure of data transmission. Further, the communication device 1 may notify the data management apparatus 3 of its own position and the charge amount determination section 533 may be configured so that a process of reducing the amount of money for data of a transmission failure may not be performed when data transmitted while the communication device 1 is in a place where the radio wave does not reach does not reach a transmission destination.

MODIFIED EXAMPLE 2

[Calculation of Statistical Data of Communication Failure]

Although an example in which a charge amount is reduced when data transmission fails has been described above, it is important to reduce a probability of a failure in data transmission for a communication carrier. Therefore, the storage section 32 may store a clock time at which non-reception data has occurred in association with a device ID and the communication control section 331 may calculate statistical values related to a time period in which non-reception data tends to occur and a cause of occurrence of non-reception data (the communication network N1 or the data acquisition apparatus 4) for each communication device 1 or each application on the basis of the stored clock time.

For example, the communication control section 331 provides a notification of a time period having a high failure probability to the relay apparatus 2 connected to the communication device 1 for which a proportion of a failure in data transmission within a prescribed time is greater than or equal to a prescribed value and instructs the relay apparatus 2 not to transmit data during the time period having the high failure probability. The communication control section 331 may issue an instruction so that data output by an application of a high failure probability due to a reason that the amount of data included in data of one packet is relatively large or the like is not transmitted during the time period having the high failure probability. Thereby, because the data communication system S can reduce a transmission failure probability, it is possible to improve a degree of satisfaction of the contractor or the data acquirer.

MODIFIED EXAMPLE 3

[Basic Amount of Money and Volume-Based Added Amount of Money]

Although an example in which the charge amount determination section 533 determines the charge amount on the basis of the amount of data provided by the communication control section 331 or the number of times of provision has been described above, the charge amount may be determined in other methods. For example, the charge amount determination section 533 may determine the charge amount by summing a prescribed basic amount of money included in a charge amount for transmission of small-sized packet data and a volume-based amount of money corresponding to the amount of packet data having a size of a prescribed amount or more.

For example, the charge amount determination section 533 includes a cost for providing data output from a sensor in a basic amount of money and performs volume-based addition on a cost for providing an image output from a camera. Thereby, a data acquirer having a small load on the communication network N1 and the communication network N2 can easily use a service because a monthly charge amount does not fluctuate and a communication carrier can receive a high cost from the data acquirer having a heavy load on the communication network N1 and the communication network N2.

MODIFIED EXAMPLE 4

[Charge Based on Magnitude Per Unit Time of Data Communication Traffic Volume]

A case in which the charge amount determination apparatus 50 in the data management apparatus 3 determines a charge amount for each contractor of the relay apparatus 2 on the basis of a data communication traffic volume of communication performed during a prescribed unit period has been described above. On the other hand, the data management apparatus 3 according to modified example 4 of the embodiment determines the charge amount for the contractor on the basis of a "magnitude per unit time of a data communication traffic volume".

That is, the data management apparatus 3 according to modified example 4 of the embodiment determines a charge amount in accordance with an "occupancy rate of a communication band" instead of a "total amount of communication data". For example, even when a sum of data communication traffic volumes within a charging unit period of one month is the same, a case in which data communication is performed in a distributed manner during a period of one month and a case in which data communication is performed in a concentrated manner during a short period are considered. A network load in the latter case is greater than that in the former case. Therefore, the data management apparatus 3 according to modified example 4 of the embodiment charges a larger fee in the latter case than in the former case.

Hereinafter, the data communication system S according to modified example 4 will be described in more detail, but parts overlapping those of the data communication system S according to the above-described embodiment will be appropriately omitted or briefly described.

Figure 11:
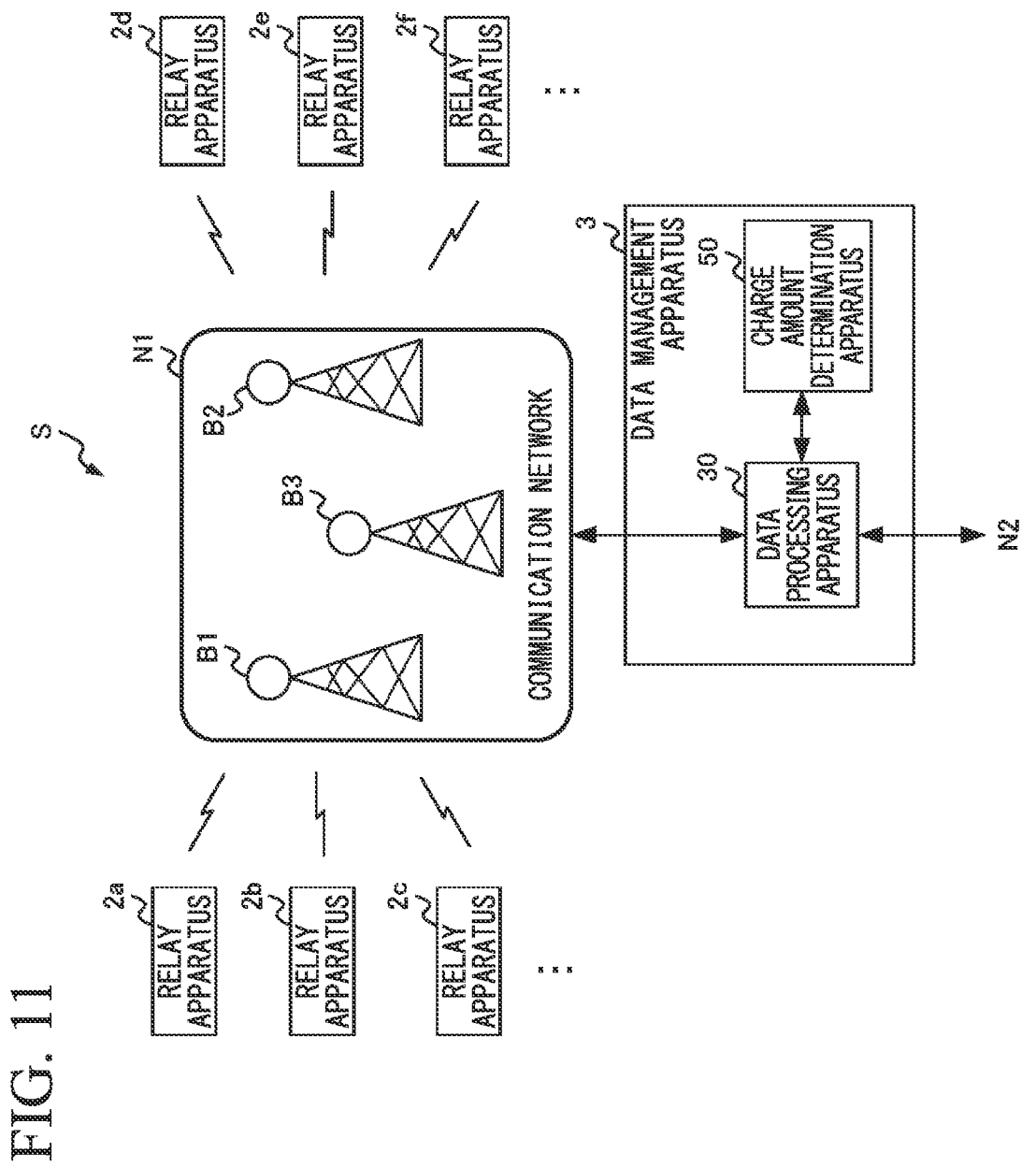
FIG. 11 is a diagram showing a configuration of a data communication system according to a modified example of the embodiment.

FIG. 11 is a diagram showing a configuration of a data communication system S according to modified example 4 of the embodiment. Although a case in which the communication network N1 is a communication network configured to include a plurality of base stations B and includes three base stations B of a first base station B1, a second base station B2, and a third base station B3 is shown in an example shown in FIG. 11, the number of base stations B included in the communication network N1 may be larger or smaller than three.

Each of the plurality of base stations B relays data to be communicated between a plurality of relay apparatuses 2 and the data management apparatus 3. Each base station B has an antenna installed on the ground, a structure, or the like and transmits and receives data to and from the relay apparatus 2 located in a prescribed range in which communication is possible including the antenna. For example, in the example shown in FIG. 11, the first base station B1 relays data communicated between a relay apparatus group including a relay apparatus 2a, a relay apparatus 2b, and a relay apparatus 2c and the data management apparatus 3. Likewise, the second base station B2 relays data to be communicated between a relay apparatus group including a relay apparatus 2d, a relay apparatus 2e, and a relay apparatus 2f and the data management apparatus 3.

Each relay apparatus 2 relays packet data that is transmitted and received by one or more communication devices 1. For example, when the communication device 1 is installed in an office, a factory or the like, the relay apparatus 2 is installed in a region where communication with the communication device 1 is possible. In this case, a contractor for each relay apparatus 2 may often be the same as an administrator or a corporation who is an owner of an office, a factory or the like. When the relay apparatus 2 is installed in a specific region, data that is transmitted and received by the relay apparatus 2 is relayed by a specific base station B having a range in which communication is possible including the relay apparatus 2.

Here, when the communication device 1 is used to manage devices of an office, a factory, and the like, the administrator of the relay apparatus 2 tends to cause the relay apparatus 2 to simultaneously transmit packet data at a prescribed timing. For example, the administrator sets the communication device 1 so that packet data including various types of information of a previous day is transmitted to a specific management server at 00:00:00 every night. Even if a communication traffic volume of data transmitted by each communication device 1 is small, a load on the communication band of the relay apparatus 2 or a communication band of the base station B that performs a relay operation for the relay apparatus 2 may increase and communication quality of the communication network N1 may deteriorate if the number of communication devices 1 for which a relay operation is performed by the relay apparatus 2 for which a contractor has made a contract is large. In particular, when different contractors make similar settings within the communication coverage area of the same base station B, the concentration of communication in a specific time becomes prominent.

Therefore, the charge amount determination apparatus 50 according to modified example 4 may determine a charge amount of a contractor on the basis of a magnitude of a data communication traffic volume per unit time instead of a sum of data communication traffic volumes of communication performed during a prescribed unit period or in addition thereto. More specifically, even when the sum of data communication traffic volumes of communication performed during the prescribed unit period is small, the charge amount determination apparatus 50 increases a charge amount for the contractor when an instantaneous data communication traffic volume increases. Thereby, the contractor of the relay apparatus 2 can be motivated to voluntarily equalize a communication traffic volume.

Hereinafter, the configuration of the charge amount determination apparatus 50 for implementing the above will be described more specifically.

FIG. 12 is a diagram schematically showing a data structure of a communication path database in which identifiers for identifying the base station B, the relay apparatus 2 for which the base station B performs a relay operation, and the contractor of the relay apparatus 2 are stored in association. The communication path database stores a relay apparatus ID for identifying each of a plurality of relay apparatuses 2 that perform communication via each base station B and a contractor ID of a contractor making a contract for the use of the communication network N1 in the relay apparatus 2 that performs communication via each base station B in association. The communication path database is stored in the storage section 52 provided in the charge amount determination apparatus 50 and is referred to by the identification section 532.

In FIG. 12, a "base station ID" is an identifier allocated to each base station B to uniquely identify the base station B. In the example shown in FIG. 12, a case in which a base station B identified by a base station ID of B00002 relays communication of relay apparatuses 2 identified by relay apparatus IDs of 9004, 9005, and 9006 is shown. Also, a contractor ID of a contractor of a relay apparatus 2 identified by a relay apparatus ID of 9004 is 00004 and both contractor IDs of contractors of relay apparatuses 2 identified by relay apparatus IDs of 9005 and 9006 are 00005.

Further, a case in which a contractor identified by a contractor ID of 00005 also has made a contract for the relay apparatus 2 identified by a relay apparatus ID of 9007 and data communication in this relay apparatus 2 is relayed to the base station B identified by a base station ID of B00003 is shown. The same is true for other data fields of the communication path database.

Also, when the relay apparatus 2 is installed in a moving object such as a vehicle, the base station B that relays data communication of the relay apparatus 2 varies with time. In this case, a relay management section (not shown) in the charge amount determination apparatus 50 may chronologically record a correspondence relationship between a relay apparatus ID and a base station ID for identifying the relay apparatus 2 and the base station B establishing the connection.

The identification section 532 refers to the communication path database and identifies a data communication traffic volume of communication performed for a prescribed charging unit time between the relay apparatus 2 and the data management apparatus 3 associated with the contractor ID for each contractor ID. Here, the identification section 532 identifies a data communication traffic volume of at least one of the amount of data communicated from the relay apparatus 2 to the data management apparatus 3, i.e., a so-called uplink data communication traffic volume, and the amount of data communicated from the data management apparatus 3 to the relay apparatus 2, i.e., a so-called downlink data communication traffic volume.

The charge amount determination section 533 determines a charge amount for the contractor on the basis of a magnitude of a data communication traffic volume per unit time of the data communication traffic volume identified by the identification unit 532. Specifically, the charge amount determination section 533 determines a charge amount for the contractor on the basis of a maximum value of the data communication traffic volume per unit time of the data communication traffic volume identified by the identification section 532, i.e., a peak value of the data communication traffic volume. More specifically, the charge amount determination section 533 increases the charge amount for the contractor in a case in which the peak value of the data communication traffic volume is large as compared with a case in which the peak value of the data communication traffic volume is small.

FIG. 13 is a diagram showing a data structure of a communication traffic volume database in which a peak value of a data communication traffic volume and an average communication traffic volume during a charging unit period between the relay apparatus 2 and the data management apparatus 3 are tabulated for each contractor. The communication traffic volume database is stored in the storage section 52 of the charge amount determination apparatus 50, and is managed by the identification section 532.

In the example of the communication traffic volume database shown 13, a case in which the peak value of the data communication traffic volume during the charging unit period is 90 Mbps for a base station B identified by a base station ID of B00002 is shown. Furthermore, a case in which the base station B identified by the base station ID of B00002 performs a relay operation for relay apparatuses 2 identified by relay apparatus IDs of 9005 and 9006 and the peak value of the relay apparatus 2 having the relay apparatus ID of 9006 therebetween is 90 Mbps is shown.

The identification section 532 updates the communication traffic volume database during each charging unit period. When the communication traffic volume database is updated, the charge amount determination section 533 determines a charge amount for a contractor on the basis of the peak value of the data communication traffic volume.

The charge amount determination section 533 may determine a charge amount for the contractor on the basis of whether or not the maximum value of the data communication traffic volume exceeds a prescribed communication traffic volume threshold value. Here, the "communication traffic volume threshold value" is a charge amount determination threshold value to be referred to when the charge amount determination section 533 determines the charge amount on the basis of the peak value of the data communication traffic volume. The charge amount determination section 533 increases the charge amount for the contractor in a case in which a peak value of a data communication traffic volume of a certain contractor has exceeded the communication traffic volume threshold value as compared with a case in which the peak value of a data communication traffic volume of the certain contractor has not exceeded the communication traffic volume threshold value.

More specifically, when the peak value of the data communication traffic volume exceeds the prescribed communication traffic volume threshold value, the charge amount determination section 533 may determine the charge amount so that the charge amount increases as the maximum value of the data communication traffic volume increases. Alternatively, the charge amount determination section 533 may determine the charge amount so that the charge amount is less when the peak value of the data communication traffic volume has not exceeded the prescribed communication traffic volume threshold value than when the peak value of the data communication traffic volume has exceeded the prescribed communication traffic volume threshold value.

The charge amount determination section 533 may further determine the charge amount on the basis of the number of times the peak value of the data communication traffic volume has exceeded the prescribed communication traffic volume threshold value during the charging unit period. That is, the charge amount determination section 533 determines the charge amount so that the charge amount increases as the number of times the peak value of the data communication traffic volume has exceeded the prescribed communication traffic volume threshold value increases during the charging unit period increases.

FIG. 14 is a diagram showing a data structure of a database obtained by tabulating the number of times a peak value of a data communication traffic volume has exceeded a communication traffic volume threshold value for each contractor during a charging unit period in the relay apparatus 2. This database is stored in the storage section 52 of the charge amount determining apparatus 50 and is managed by the identification section 532. By referring to this database, the charge amount determination section 533 can determine the charge amount for each contractor.

In the example shown in FIG. 14, a case in which the peak value of the data communication traffic volume has exceeded the communication traffic volume threshold value three times during a certain charging unit period in a base station B identified by a base station ID of B00002 is shown. Also, as details thereof, the peak value of the data communication traffic volume of a relay apparatus 2 identified by a relay apparatus ID of 9005 has exceeded a communication threshold value twice and the peak value of the data communication traffic volume of a relay apparatus 2 identified by a relay apparatus ID of 9006 has exceeded the communication threshold value once as shown.

Also, it is only necessary for the communication carrier for providing a service using the communication network N1 to determine a specific value of the communication traffic volume threshold value in consideration of a maximum value of the communication capacity of the base station B and the like. For example, the specific value may be a value corresponding to 30% of the maximum value of the communication capacity of the base station B. The communication carrier may publish the specific value of the communication traffic threshold value to each contractor. Thereby, the contractor can be motivated to voluntarily equalize a data communication traffic volume. As a result, a load on the communication infrastructure can be reduced.

As described above, data transmission clock times set by the contractors in the communication devices 1 tend to overlap, for example, after 0 o'clock in the middle of the night. Therefore, the charge amount determination section 533 determines the charge amount for the contractor on the basis of a data communication traffic volume per unit time during the predetermined prescribed time period among data communication traffic volumes identified by the identification section 532.

Here, when the charge amount determination section 533 determines the charge amount on the basis of the peak value of the data communication traffic volume, the "predetermined prescribed time period" is a time period set for detecting the peak value. It is only necessary to determine a specific range of the predetermined prescribed time period in consideration of the data communication traffic volume or the like for each time period in the base station B. For example, the specific range may be 10 minutes from 23:55:00 to 00:05:00. The communication carrier may publish a predetermined prescribed time period to each contractor. Also, the contractor of the relay apparatus 2 may be configured to be able to select a communication frequency and a time period in which the relay apparatus 2 performs communication.

Further, when a time period during which the contractor of the relay apparatus 2 causes the relay apparatus 2 to perform communication is selected, the communication carrier may cause a fee for each time period to be displayed in a selectable form. The above functions can be implemented by causing the data management apparatus 3 to function as a web server so that a contractor of the relay apparatus 2 can access the data management apparatus 3 using a PC or the like. Thereby, the contractor is motivated to voluntarily avoid communication during such a time period. As a result, it is possible to induce the contractor to perform data communication during a time period when the load on a communication infrastructure is light.

As described with reference to FIG. 11, when the relay apparatus 2 is installed in a specific region, data that is transmitted and received by the relay apparatus 2 is relayed by a specific base station B having a range in which communication is possible including a position of the relay apparatus 2. In this case, if the contractors of the relay apparatus 2 make settings so that they cause the communication devices 1 to perform data communication in a concentrated manner during a specific time period, the communication quality of the base station B during the time period may deteriorate.

Therefore, the identification section 532 identifies, for each contractor ID, a sum of data communication traffic volumes of communication performed by the relay apparatus 2 using the relay apparatus 2 installed within a prescribed region as a unit among relay apparatuses 2 associated with the contractor ID. Here, the "prescribed region" is an installation region of the base station B that is a unit when the identification section 532 identifies the sum of data communication traffic volumes.

FIG. 15 is a diagram schematically showing a data structure of a regional database that stores a relationship between the base station B and an installation region thereof in association. The regional database is stored in the storage section 32 of the data processing apparatus 30.

In the regional database, a "region ID" is an identifier allocated to each region to identify the installation region of the base station B.

In the example of the regional database shown in FIG. 15, a case in which three base stations B identified by base station IDs of B00001, B00002, and B00003 are installed in a region identified by a region ID of A0001 is shown. Also, a case in which only a base station B identified by a base station ID of B00004 is installed in a region identified by a region ID of A0002 is shown. The same is true for other data fields.

The identification section 532 identifies a sum of data communication traffic volumes of communication performed by the relay apparatus 2 via a base station B for each contractor ID using the base station B serving as a communication path of the relay apparatus 2 associated with the contractor ID as a unit. The charge amount determination section 533 determines a charge amount for the contractor on the basis of a peak value of a data communication traffic volume tabulated by the identification section 532 in a so-called "base station unit". Thereby, because the contractor can be expected to voluntarily operate so that the peak value of the data communication traffic volume decreases, contribution to equalization of the data communication traffic volume of the base station B is possible.

The identification section 532 may identify the data communication traffic volume of communication performed by the relay apparatus 2 for each contractor ID using the relay apparatus 2 for which a contract has been made in the contractor ID as a unit. The charge amount determination section 533 determines the charge amount for the contractor on the basis of the peak value of the data communication traffic volume tabulated by the identification section 532 in a so-called "relay apparatus unit".

Here, the communication carrier may cause the data management apparatus 3 to function as a web server and provide a base station ID of each base station B, information of a relay apparatus 2 under control of the base station B identified by the base station ID, information about transition of a data communication traffic volume for each time period in each base station B or each relay apparatus 2, and the like in a form made viewable by each contractor. The communication carrier may further cause the data management apparatus 3 to provide a simulation function for a communication fee when a communication time period and a timing are changed on the basis of statistical data for previous data communication with respect to a contractor for each contractor. Thereby, it is possible to guide the contractor to perform data communication during a time, period when a load on a communication infrastructure is light.

When the contractor of the relay apparatus is a corporation, a large number of communication devices may execute data communication via the relay apparatus. Particularly, when a communication device is used for the purpose of management of facilities and the like, data communication tends to concentrate on a specific time period and there is a concern that the communication quality during the time period will deteriorate. There was a problem that it is difficult to distribute concentrated data communication traffic volumes by the initiative of a communication service provider because the time of data communication that is performed by contractors is not under the control of communication carriers that manage portable phone networks. According to the above-described embodiment, it is possible to equalize the amount of communication data when a contractor for a communication service uses a large number of communication devices.

Although the present invention has been described with reference to the embodiments, the technical scope of the present invention is not limited to the scope described in the above embodiments. It is obvious to a person skilled in the art that various modifications or improvements can be added to the above embodiments. In particular, specific embodiments of distribution and integration of apparatuses are not limited to the configurations shown in the drawings. It is possible to configure all or some of apparatuses by functionally or physically distributing or integrating the apparatuses in any units in accordance with various additions or the like or in accordance with functional loads.

For example, although a case in which the communication device 1 and the relay apparatus 2 are physically different devices has been described above, the communication device 1 and the relay apparatus 2 may be integrated. Also, although a case in which the communication device 1 includes a plurality of sensors has been described, the communication device 1 and the plurality of sensors may be separated and the communication device 1 may receive signals output from the plurality of sensors and transmit the received signals to the relay apparatus 2.

Also, although a case in which data processing apparatus 30 and the charge amount determination apparatus 50 are physically different apparatuses has been described, the data processing apparatus 30 and the charge amount determination apparatus 50 may be integrated.

INDUSTRIAL APPLICABILITY

It is possible to determine a charge amount in data processing in which data is transmitted from a relay apparatus collecting the data from a communication device to a server via a communication network as an appropriate amount of money.

REFERENCE SIGNS LIST

1 Communication device
2 Relay apparatus
3 Data management apparatus
4 Data acquisition apparatus
21 Device communication section
22 Control section
23 Network communication section
24 Storage section
30 Data processing apparatus
31 Communication section
311 First communication section
312 Second communication section
313 Third communication section
32 Storage section
33 Control section
331 Communication control section
332 Request acceptance section
333 Storage control section
50 Charge amount determination apparatus
51 Communication section
52 Storage section
53 Control section
521 Contractor charge database
522 Acquirer charge database
531 Data management section
532 Identification section
533 Charge amount determination section

What is claimed is:

1. A data management apparatus for managing a plurality of data items output by a plurality of communication devices that output data, the data management apparatus comprising:
   at least one memory configured to store instructions; and
   at least one processor configured to execute the instructions,
   wherein the at least one memory is configured to store an acquirer identification of a data acquirer who acquires data, in association with an application identification of an application, and
   the at least one processor is configured to:
   receive a data acquisition request including the acquirer identification from a data acquisition apparatus;
   extract, based on the acquirer identification included in the data acquisition request, data output by the application corresponding to the application identification stored in the at least one memory in association with the acquirer identification, among the plurality of data items received from the plurality of communication devices via a relay apparatus; and
   transmit the extracted data to the data acquisition apparatus.

2. The data management apparatus according to claim 1, wherein the at least one processor is configured to store a contractor identification corresponding to the application identification, and associate the extracted data with the contractor identification.

3. The data management apparatus according to claim 2, wherein the at least one processor is configured to charge for each of the contractor identification based on the contractor identification.

4. The data management apparatus according to claim 1, wherein the at least one processor is configured to acquire a plurality of application identifications included in data acquisition requests received from the data acquisition apparatus, extract the data corresponding to each of the plurality of application identifications, and transmit the extracted data to the data acquisition apparatus.

5. The data management apparatus according to claim 1, wherein the at least one processor is configured to extract the data, corresponding to one application identification, output by the plurality of communication devices.

6. The data management apparatus according to claim 5, wherein the application corresponding to the one application identification is executed by the plurality of communication devices.

7. The data management apparatus according to claim 1, wherein a plurality of applications are executed by the communication device, and
the at least one processor is configured to receive the plurality of data items corresponding the plurality of applications executed by the communication device.

8. The data management apparatus according to claim 1, wherein the data acquisition request includes a device identification for identifying each of the plurality of communication devices, and
the at least one processor is configured to extract the data corresponding to the device identification and the application identification included in the data acquisition request, among the plurality of data items received from the plurality of communication devices via the relay apparatus.

9. A data management method for managing a plurality of data items output by a plurality of communication devices that output data, the data management method comprising:
storing an acquirer identification of a data acquirer who acquires data, in association with an application identification of an application;
receiving a data acquisition request including the acquirer identification from a data acquisition apparatus;
extracting, based on the acquirer identification included in the data acquisition request, data output by the application corresponding to the application identification stored in the at least one memory in association with the acquirer identification, among the plurality of data items received from the plurality of communication devices via a relay apparatus; and
transmitting the extracted data to the data acquisition apparatus.

10. The data management method according to claim 9, further comprising:
storing a contractor identification corresponding to the application identification, and
associating the extracted data with the contractor identification.

11. The data management method according to claim 10, further comprising:
charging for each of the contractor identification based on the contractor identification.

12. The data management method according to claim 9, further comprising:
acquiring a plurality of application identifications included in data acquisition requests received from the data acquisition apparatus,
wherein in the extracting, the data corresponding to each of the plurality of application identifications is extracted, and
in the transmitting, the extracted data is transmitted to the data acquisition apparatus.

13. The data management method according to claim 9, wherein in the extracting, the data, corresponding to one application identification, output by the plurality of communication devices is extracted.

14. The data management method according to claim 13, wherein the application corresponding to the one application identification is executed by the plurality of communication devices.

15. The data management method according to claim 9, wherein a plurality of applications are executed by the communication device, and
the data management method further comprises receiving the plurality of data items corresponding the plurality of applications executed by the communication device.

16. The data management method according to claim 9, wherein the data acquisition request includes a device identification for identifying each of the plurality of communication devices, and
in the extracting, the data corresponding to the device identification and the application identification included in the data acquisition request, among the plurality of data items received from the plurality of communication devices via the relay apparatus, is extracted.

17. The data management apparatus according to claim 1, wherein the at least one memory is configured to store the acquirer identification in association with a device identification for identifying each of the plurality of communication devices and the application identification, and store the plurality of data items output by the plurality of communication devices in association with the device identification, and
the at least one processor is configured to extract, based on the acquirer identification included in the data acquisition request, the data output by the application on a communication device corresponding to the device identification and the application identification stored in the at least one memory in association with the acquirer identification, among the plurality of data items received from the plurality of communication devices via the relay apparatus.

18. The data management apparatus according to claim 17, wherein the at least one processor is further configured to determine a charge amount for the acquirer identification based on a combination of the device identification and the application identification associated with the acquirer identification.

* * * * *